(12) United States Patent
Savoy et al.

(10) Patent No.: US 6,691,392 B2
(45) Date of Patent: Feb. 17, 2004

(54) METHOD AND APPARATUS FOR ASSEMBLING EXTERIOR AUTOMOTIVE VEHICLE BODY COMPONENTS ONTO AN AUTOMOTIVE VEHICLE BODY

(75) Inventors: Mark A. Savoy, Metamora, MI (US); John A. Kline, Cape Coral, FL (US)

(73) Assignee: Utica Enterprises, Inc., Shelby Township, MI (US)

( * ) Notice: Subject to any disclaimer, the term of this patent is extended or adjusted under 35 U.S.C. 154(b) by 0 days.

(21) Appl. No.: 10/146,780

(22) Filed: May 16, 2002

(65) Prior Publication Data

US 2002/0170160 A1 Nov. 21, 2002

Related U.S. Application Data

(60) Provisional application No. 60/291,522, filed on May 16, 2001.

(51) Int. Cl.$^7$ .............................................. B23Q 17/00
(52) U.S. Cl. .................. 29/407.09; 29/407.01; 29/407.1; 29/464; 29/466; 29/468; 29/705; 29/709; 29/712
(58) Field of Search .................... 29/407.01, 407.09, 29/404, 434, 464, 466, 468, 33 K, 281.1, 281.4, 281.5, 714, 712, 705, 707, 709, 407.1

(56) References Cited

U.S. PATENT DOCUMENTS

| | | |
|---|---|---|
| 3,021,172 A | 2/1962 | Fiala et al. |
| 3,541,668 A | 11/1970 | Wessells III, et al. |
| 4,186,476 A | 2/1980 | Mair et al. |
| 4,445,273 A * | 5/1984 | Van Brussel et al. ......... 29/714 |
| 4,589,184 A | 5/1986 | Asano et al. |
| 4,589,199 A * | 5/1986 | Ohtaki et al. ................. 29/714 |
| 4,619,031 A * | 10/1986 | Loewe et al. ................. 29/434 |
| 4,736,515 A | 4/1988 | Catena |
| 4,813,125 A * | 3/1989 | Dacey, Jr. .................... 29/714 |
| 4,860,424 A * | 8/1989 | Kaibuki et al. ............... 29/434 |
| 4,964,722 A | 10/1990 | Schumacher |
| 4,976,026 A * | 12/1990 | Dacey, Jr. .................... 29/714 |
| 5,005,277 A * | 4/1991 | Uemura et al. .......... 29/407.04 |
| 5,011,068 A | 4/1991 | Stoutenburg et al. |
| 5,072,506 A * | 12/1991 | Dacey, Jr. .................... 29/464 |
| 5,090,105 A | 2/1992 | DeRees |
| 5,150,506 A | 9/1992 | Kotake et al. |
| 5,168,453 A * | 12/1992 | Nomaru et al. ............. 700/114 |
| 5,181,307 A | 1/1993 | Kitahama et al. |
| 5,199,156 A | 4/1993 | Rossi |
| 5,203,073 A | 4/1993 | Kotake et al. |
| 5,216,800 A | 6/1993 | Nishigori |
| 5,267,683 A | 12/1993 | Hamada et al. |
| 5,380,978 A | 1/1995 | Pryor |
| 5,397,047 A | 3/1995 | Zampini |
| 5,409,158 A | 4/1995 | Angel |
| 5,427,300 A | 6/1995 | Quagline |

(List continued on next page.)

FOREIGN PATENT DOCUMENTS

EP     0 320 315     *   6/1989      ........... B62D/65/00

*Primary Examiner*—Gregory Vidovich
*Assistant Examiner*—Essama Omgba
(74) *Attorney, Agent, or Firm*—VanOphem & VanOphem, P.C.

(57) ABSTRACT

The present invention generally relates to a method and apparatus for the assembly of body components to an automotive body that has undergone a progressive series of framing and welding steps so as to produce a structurally rigid body frame, termed a body-in-white. More specifically, this invention relates to creating a new net locating scheme (X-Y-Z coordinate system) for a body-in-white to direct associated tooling to create net attachment features on said rigid body frame so that components may be attached to said automotive body at a net location eliminating the need for any slip plane attachment techniques.

34 Claims, 12 Drawing Sheets

U.S. PATENT DOCUMENTS

| | | |
|---|---|---|
| 5,740,598 A | 4/1998 | Sauve |
| 5,829,123 A * | 11/1998 | Shashlo et al. ............... 29/703 |
| 5,845,387 A | 12/1998 | Bonnett et al. |
| 5,987,726 A | 11/1999 | Akeel |
| 6,006,635 A * | 12/1999 | Stojkovic et al. ............. 81/484 |
| 6,073,330 A * | 6/2000 | Roy ........................... 29/281.5 |
| 6,098,265 A * | 8/2000 | Stojkovic et al. ............. 29/464 |
| 6,122,819 A * | 9/2000 | Roy et al. ..................... 29/714 |
| 6,129,413 A | 10/2000 | Klein |
| 6,236,905 B1 * | 5/2001 | Whitmarsh ................. 700/229 |
| 6,334,264 B1 * | 1/2002 | Oh ............................... 33/613 |
| 6,340,107 B1 | 1/2002 | Cappa et al. |
| 6,360,421 B1 | 3/2002 | Oatridge et al. |
| 6,430,835 B1 * | 8/2002 | Ranucci et al. ............... 33/645 |
| 6,481,096 B2 * | 11/2002 | Lehmker et al. ............... 29/721 |
| 2002/0023334 A1 * | 2/2002 | Rhoads et al. ................ 29/434 |
| 2002/0100155 A1 * | 8/2002 | Nakamura ................. 29/407.1 |

\* cited by examiner

METHOD AND APPARATUS FOR ASSEMBLING EXTERIOR AUTOMOTIVE VEHICLE BODY COMPONENTS ONTO AN AUTOMOTIVE VEHICLE BODY

CROSS-REFERENCES TO RELATED APPLICATIONS

This application claims the benefit of U.S. provisional application Ser. No. 60/291,522 filed May 16, 2001.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention generally relates to a method and apparatus for the assembly of body components to an automotive body that has undergone a progressive series of positioning and welding steps so as to produce a structurally rigid body frame, termed a body-in-white. More specifically, this invention relates to reestablishing a new grid system (XYZ coordinate system) for a body-in-white, after assembly, so as to direct the associated tooling to establish net attachment positions for all body components thereby eliminating the need for any slip plane adjustment techniques.

2. Description of the Related Art

For many decades, automobile and truck body frames, that typically include at least an underbody, a pair of side frames, and front and rear headers, conventionally undergo a progressive series of positioning and welding steps before a structurally rigid body frame, termed a body-in-white, is produced. Though bodies are still manually assembled and welded, emphasis on automated assembly and welding operations has for many years generated numerous automated and semi-automated framing systems.

In an attempt to create and maintain dimensional integrity in the building of automotive bodies, typically, framing systems that involve a degree of automation include the operations of locating the components relative to each other on the underbody. Primary locating points established on the underbody are used throughout the body shop operation as well as in the body inspection room and are generally established by locating on each of the rails, a four way locating pin forward and a two way locating pin rearward. Usually, the underbody is then clamped in place at specific points of location. The primary locating points are also used to locate for purposes of inspecting in the body build shop. The components are located relative to each other and relative to the underbody and are loosely assembled to each other. Typically, the various components include a floor panel, right and left body side panels, a dash panel and either a roof panel or transversely extending header members upon which a roof panel is subsequently mounted. After these individual panels are stamped, in some applications, preliminary assembly operations are performed on individual panels as, for example, adding door hinge and latch hardware to the body side panels at approximate locations on a door opening, adding seat mounting brackets and reinforcements to the floor panel, etc.

The set of panels that constitute a subassembly of the finished vehicle body are then brought together and loosely assembled to each other. This initial loose assembly frequently is accomplished by a so called "toy tab" arrangement in which one panel is created with a tab projecting from one edge that is received in a slot in an adjacent panel. This technique interlocks the panels and frame members to each other to the point where they will not separate from each other, but does not achieve a rigid assembly, that is, for example, the side panels may tilt slightly relative to the floor panel. Alternatively, some initial pre-tack welding may be performed in order to loosely maintain the components together. The loosely assembled subassembly is then transported to a framing/welding station whereat, in order to accurately establish the desired final geometry of all of the components of the body-in-white, the toy tab components are clamped to locating frames, often termed gate fixtures. Thereafter, welding operations, are performed within the framing and respot station to more permanently and securely weld the components together to accurately form a rigid structure referred to as the body-in-white. Current body framing stations employ both fixed and robotic welders that can be programmed to perform several welds at different locations on the body in one framing station. The welders typically are located at opposite sides of the conveying line at the welding station, and when the body's subassembly is located in the welding station, the fixed weldings and robotic welders perform welds on designated areas on the body. In those cases where clamping frames are positioned on opposite sides of the body, clearance problems may restrict motion of the welding heads that must pass through the clamping frame before they have access to the body. This will result in the performance of only a portion of the required welding at one station and the advancement of the partially welded subassembly to an additional respot welding stations where different clamping frames allow the welding head to access those portions of the body assembly that could not be reached by the welding heads in the first station. After the body is transported to the final welding, or respot, station the remaining welds are made to establish a structurally rigid body frame.

Although many variations of the above process are known, it is the general object of each framing system to accurately net locate the body components relative to each other and maintain the established net location or position throughout the later welding operations, until the structural rigidity of the body-in-white is sufficient to preserve the desired geometric configuration throughout the assembly process.

It is readily recognized that these conventional assembly techniques include many assembly steps that require parts to be physically stacked on top of one another and then secured to each other by welding, and wherein each component is created with a certain accuracy and tolerance. That is, a particular component, and any point on that component, is typically required to be manufactured to a specific dimensional configuration, within a specified tolerance range. If an individual panel to be affixed references a point on another panel, the reference point also has a dimensional tolerance variation. The tolerance of the assembly formed by these components will also be "stacked" together. That is, the dimensional tolerance of the first panel will be added, to some degree, to that of the second panel to be attached thereto. As more components are fixed to the assembly that references additional attachment points, the tolerances of the individual points are "stacked" to create a greater tolerance variation for the "stacked" components.

The small tolerance variations in the primary locating points for locating the underbody combined with the gate fixtures that typically allow some play in the positioning of the panels prior to clamping inherently results in some built-up inaccuracies for the body-in-white. Also, the repositioning of the framing system in a respot station, again, results in an additional positional tolerance inherently creating additional inaccuracies for the location of the various panels with respect to each other. Accordingly, it is quite evident that as a number of panels with positional dimensional tolerances are stacked the total manufacturing tolerance of the framed body-in-white will increase. Experience has shown that the "stacking" built in tolerances in the framing process increases the total manufacturing tolerance and can become quite substantial.

Accordingly, over a period of years, many have attempted to improve the manufacturing method so as to reduce the overall or total tolerance in vehicle assemblies utilizing a variety of techniques in an attempt to reduce the inherent inaccuracies of the vehicle body assembly as well as the body-in-white.

To attempt to reduce the inherent built in inaccuracies in the process of building automobile bodies with the objective of reducing overall tolerance variations, many alternative framing schemes have been proposed over the years. For example, DeRees, U.S. Pat. No. 5,090,105, teaches a modular vehicle construction assembly method in which various structural modules are fabricated and assembled with operating vehicle components prior to mounting with other fabricated and assembled modules. For example, a first module having a chassis frame and a passenger platform that is used in the formation of the underbody of the vehicle is proposed. A second module in the form of a cowl or dashboard includes a structural frame, preferably formed from stamped panel components, that include a windshield frame portion integrally formed with a dash panel frame portion. A third modular component includes of a flooring platform, two first side-wall structures and at least one closure device extending across the first sidewall structures above or at one end of the flooring system. The fourth module includes two second sidewall structures, reinforcement for supporting the second sidewall structures in a fixed position with respect to each other, a hood panel and device for displaceably mounting at least a portion of the fourth module to the first module. Each of the first through fourth modules is completely assembled, including the installation of vehicle operating components, prior to its attachment to the other modules. The resulting structure incorporates each of the modules by locating each module at a net position thereby reducing the overall built up tolerance for the complete assembly. However, within each module, DeReese is still proposing that the device for securing the panels together utilizes conventional welding techniques or welding substitutes such as mechanical interlocking of the panels, mechanical fastening, bonding with adhesives, bolting, riveting or the like.

Angel, U.S. Pat. No. 5,491,058, teaches a framing device for assembling and welding a body-in-white utilizing completely separate framing and welding operations that are typically intermixed in conventional framing systems. The framing device is a unitary frame structure within which an underbody, side frames, and other body components can each be supported and accurately positioned with respect to each other prior to the welding operation. Using an appropriate number of clamping devices, the net position of the body components that constitute the body-in-white are properly established and maintained, such that gate fixtures are unnecessary during the welding operation. The structure of the framing device provides considerable access to the body-in-white supported within the interior of the framing device such that a greater number of welding guns can be used during the welding process to complete all of the welding necessary to maintain the rigidity and geometry of the body-in-white in a single welding operation or station.

Bonnet et al., U.S. Pat. No. 5,845,387, teach a method of constructing a vehicle body with reference to a single assembly station by moving multiple panels into an assembled position nonclampingly fixed with an adhesive and in spaced relationship without direct contact therebetween. The vehicle body is constructed by presenting a plurality of discrete body panels into assembled positions with respect to a single base for application of an adhesive thereon to fix the body panels in a nonclamping, spaced relationship without direct contact therebetween. The body panels include an underbody, a first side panel on a first side of the underbody and a second side panel on a second side of the underbody, a front end member mated with the underbody, the first side panel and the second side panel, and a roof panel substantially co-planar with the underbody in mating relationship with upper mating flanges on the first and second side panels. Such structure avoids tolerance stack up between the assembled panels by controlling the adhesive bond gap variance between the panels. The adhesive is a heavy-duty urethane structural adhesive. The resulting vehicle body assembly reduces tolerance stack-up and has the additional advantage of having relatively little inherent stress points developed between mating panels since they are assembled at a single stage framing fixture, or assembly apparatus.

Oatridge et al., U.S. Pat. No. 6,360,421, like DeReese, teach a manufacturing or assembly technique wherein the assembly includes a plurality of individual components that are independently formed into a substantially rigid initial subassembly structure thereafter, for each remaining component referencing from the substantially rigid structure a desired position for each remaining component and fixing such remaining component to the subassembly at the desired position whereby the overall tolerance of the manufactured assembly is reduced.

Although a majority of the prior art has recognized the existence of built in inaccuracies in the building of automotive bodies, by the stacking of tolerances between adjacent components, resulting in unacceptable mating conditions, little has been said in the prior art regarding those inherent inaccuracies of the various processes themselves. For example, many of the processing techniques require the rigid clamping of the various components, panels or subassemblies on the fixtures for the purpose of obtaining maximum support rigidity before the components are welded together. However, if any misalignment exists between associated components or panels, the spot welding that creates the weld will tend to displace the component or panel from the desired assembly location to some unknown position relative to design intent or an established X, Y and Z Cartesian coordinate systems. Accordingly, although modular construction may be suggested to avoid tolerance build up, the clamping of the modular components into the rigid fixtures can easily result in stretching or compression points in the vehicle body that may cause stress induced cracks or other deficiencies especially after the weld is created. Thus, the problem with existing fixtures whether they are framing fixtures or tooling to assemble modular components is that these assemblies are assembled with internal stresses that can cause deformities in the assembled sheet metal resulting in failures to the assemblies when in use i.e. popped welds etc. Further, after clamping these components or panels into the rigid fixtures, thousands of welds are produced resulting in additional stresses as well as distortion due to the heat and pressure associated with the use of welding guns leading to the conclusion that after the body-in-white has been processed in the appropriate framing and welding stations, it is impossible to know the final location of the surfaces as well as any targets, master holes or whatever else is attached to the panels before the welding operations occur. Although the objective in the framing and welding station is to locate panels at so called "net" or design intent locations, the variety of unknowns due to processing through the stations causes every vehicle body and its associated surfaces to be built differently. In the past this has been considered to be an acceptable body to process providing that master attachment points or panels are within an acceptable tolerance range from net or design intent location. For decades, it has been common practice in the automobile industry to incorporate a "slip plane" in the assembly of outer body panels to the body-in-white. The slip plane enables the appropriate outer panels to be attached and manually fit at assembly relative to adjacent panels. Until recently, a slip plane was necessary in order to meet quality and fit requirements of the marketplace and competition, and to provide an appearance that is more pleasing and more aerodynamic due to flushness and/or alignment of features on an outer panel with adjacent outer surfaces of a vehicle.

Slip planes are designed in component assemblies where as a result of manufacturing variations of the components, as for example a door and a hinge on a vehicle, it is necessary to provide a device to enable a door to be fit to the body opening at final assembly. The slip plane permits fore/aft and up/down adjustment of the hinge as necessary to permit the door to be fitted within the body opening with an equidistance gap around the door and between body openings. Slip planes can be planned to be within any coordinate or plane of an X, Y and Z coordinate system as for example on a vehicle the fore/aft direction, cross-car direction and up/down direction that are respectively designated as X, Y and Z. The appropriate plane to incorporate a slip plane is based on the specific surface feature required to be aligned with respect to an adjacent surface feature on an adjacent outer panel of the vehicle body. The slip plane is an adjustment feature that compensates for the inevitable tolerance variations that differs between vehicles. Slip planes are generally used at the interface between attachment points as for example a door hinge and the major trim panels to which the hinge is to be attached to the vehicle body. Because of the tolerance variations of the body-in-white, excessive gapping may result between panel or between the door and a door opening. Further, in the case of moving trim panels such as doors, and decklids, pinch points may occur as a result of variation in location of the attachment point with respect to the opening in which the major panel is mounted. Accordingly, a slip plane, as for example in the door hinge and/or door panel, has always been used to provide for manual final fitting of the door with respect to the opening to balance out the gap between the doors and major trim panels, such as fenders, as well as to ensure proper flushness of adjacent major outer panels.

The problem of inherent stresses and distortions as a result of the assembly process has been recognized in the prior art and several attempts to provide more accuracy in the assembly process of a vehicle have been made in order to solve the problem.

Earlier, it was believed that by establishing the attachment points at net or design intent position on the body-in-white frame structure at least some of the inaccuracies between the panel to be attached and the body-in-white would be eliminated. However, due to the distortions of the body-in-white as a result of the assembly/welding processes, it was still necessary to provide a slip plane in order to permanently attach the outer body attachment panels for the purpose of obtaining proper gaps and correct flushness between adjacent panels as well as alignment of feature lines between adjacent panels. The apparatus and process by which a device established a datum position from an object having dimensional variations within a known tolerance range is disclosed in U.S. Pat. No. 4,976,026 to Dacey, Jr. and is owned by the current assignee hereof. Dacey Jr. teaches an apparatus and method for establishing a location in space (a datum position) utilizing an object having dimensional variations in each of the X, Y and Z planes within a known tolerance range. Upon establishing a location in space, the device is immobilized at the datum position and work is performed on the body-in-white with respect to the datum position. The apparatus includes a fixed base structure for rigid mounting to a floor adjacent to an assembly line, a transfer platform moveably attached to the base structure so that the transfer platform can move in a horizontal direction with respect to the fixed base structure, a support structure assembly attached to the transfer platform that is adapted to move in a horizontal direction perpendicular to the direction of movement of the transfer platform, a vertical slide assembly moveably attached to the support structure assembly and moveable therewith in a vertical direction, fluid actuated positioning and locating members attached to the apparatus for immobilizing the horizontal and vertical movements of the apparatus, as well as a plurality of probes attached to the apparatus for locating pre established selected reference surfaces or gage points from which the datum position can be established. The invention further includes a work performing tool attached to the position finding apparatus so that it can perform work on the object with respect to the established datum position. Since the apparatus of Dacey Jr. relied on utilizing reference positions on the body-in-white, that resulted from imprecise and unknown locations due to the inherent stresses and distortions created during the assembly process, the positions were continuously different although within an acceptable tolerance range on each body-in-white. The datum position established based on these unknown distortions of the body-in-white created by the assembly and welding processes provided so called "design intent" positions that varied significantly as a function of the inaccuracies of the vehicle frame created at assembly.

Akeel, U.S. Pat. No. 5,987,726, teaches a solution to avoid the creation of internal stresses that could cause failure of the assemblies when in use. Akeel, teaches an apparatus for positioning an object during an assembly operation including a parallel link programmable positioning mechanism having a base plate, a spaced apart locator plate and six linear actuator links extending between the two plates and attached thereto by universal joints. The base plate is connected to the locator plate with the plurality of linear actuators, each having a lower end pivotably attached to the base plate and an upper end pivotably attached to the locator plate. When an object is mounted on the locator plate, the linear actuators are controlled to move the locator plate to a predetermined position relative to the base plate for contacting the object mounted on the locator plate with a component to be assembled. A feedback signal is generated representing a force supplied to the locator plate when the object contacts the component and thereafter the linear actuators are actuated to change the applied force in response to the feedback signal. This locating method provides for a stress free assembly of sheet metal components on assembly fixtures.

Kotake et al., U.S. Pat. No. 5,150,506, also teach a method of assembling exterior parts of an automobile wherein assembly accuracy errors of the vehicle body or body-in-white are determined by measuring the actual positions of a plurality of reference points of the body-in-white after it has been processed through the framing/welding station. Correction data is then generated by comparing the actual measured position of a point to the wire frame data or design intent position of the same point while maintaining a correlated relationship amongst the parts, to eliminate correlated misalignment among those parts due to assembly accuracy errors of the body. The measurement of the assembled position of the vehicle body may be made at the assembly station of the parts or at any arbitrary station that is located on an upstream side of the assembly station. In the latter case, the measured, as assembled data is read by a processor that generates correction data for the parts assembled positions that is transmitted from the measuring station to the assembling station. When the vehicle body is conveyed into the assembling station, the conveyed position is detected by encoders and the parts are assembled after corrections are made in accordance with the correction data. The reference points of the vehicle body are detected by the encoder device provided at the assembling station and, on the basis of the positional information, correction data for each assembling position of an exterior part is calculated by comparing the actual position detected by the encoders with the wire frame data in a computer so that the correction data is transmitted to a robot controller of a corresponding assembly robot to correct the assembling position of each part.

Accordingly, as desired, the location of any individual point on a panel after the body has been welded together is determined by the use of encoders and the deviation from the mean position of the point is calculated by comparing the actual reading to the net location of where that point should be so that a deviation from mean of the location of the point is determined. This deviation, in the form of a correction data, is communicated to the assembling robot in order to instruct the robot of the actual position of the point on the body-in-white panel with respect to the design intent position so that each component to be assembled at that point may be separately adjusted to a corrected position in order to provide a correction is made when comparing the actual location of the attachment point to the mean location to ensure that the holes in the outer panels line up properly with the holes in the underbody to enable a successful attachment of the outer panel and ensure flushness to adjacent panels. Obviously, when using this sophisticated equipment in a production environment many problems can surface including but not limited to, environmental debris as a result of welding operations, sensitivity problems with the equipment, technical support team necessary to monitor equipment, etc. Also an additional station is needed in the production line to enable measurement by the encoders of the actual points on the body-in-white.

Therefore, what is needed is an apparatus and technique for assembling automotive frame components that recognizes and accepts the existence of these internal stresses and distortions of the various panels constituting the body-in-white that have been welded with, in some cases, as many as three thousand welds, yet is able to establish a reliable assembly technique utilizing a feature of Dacey Jr., that is, insuring the fabrication of attachment points that are in a net or best fit position on the complete body-in-white that is also then assured to be in a known position so that the outer panels may be directly attached to the body-in-white with attachment points assured to be in the same position so that the outer panels may be directly attached to the body-in-white without the need for slip planes and without the need for being concerned of the inherent variations established by the body building process itself.

BRIEF SUMMARY OF THE INVENTION

According to the present invention, there is provided an apparatus and method for a new master locating scheme in the form of a master location station in the assembly of components to automotive vehicle bodies, otherwise known as a body-in-white, after the body-in-white has been processed through the framing station whereafter a work performing tooling platform is positioned with respect to the new master locating scheme and work is performed on the body-in-white to create net attachment features on all portions of the body-in-white so that other components are intended to be attached to produce a finished vehicle body that meets the flushness and gap specifications between adjacent panels established by the vehicle design team.

The apparatus of the present invention is intended to be part of the production line after the various panels have been framed and welded together as a unit to establish a completed body-in-white. The apparatus of the new mastering station includes an overhead structure strattling a production line having a front and rear gantry arrangement so that the body-in-white can pass through there under. The body-in-white is transported by a carrier device along an assembly line. With four position detecting apparatuses located along the path of the body-in-white and the plurality of work performing apparatus attached to the position detecting apparatuses on each side of the vehicle body. Each position detecting apparatus includes probes for locating up/down fore/aft and cross-car features of the body-in-white. Each position detecting apparatus includes probes that have been specifically selected to find primary locating points on the body-in-white so as to locate pre established variable reference surfaces on the body-in-white and once established, lock into place for the duration of the assembly process on a specific vehicle. Since the probes are engaging surfaces which have already been processed through the framing station, the effect of distortion of each of these primary locating points and inherent process variables of the body-in-white as a result of the assembly and welding processors will be realized by these probes. Once the positioned detecting apparatus is locked into place, a specific point in terms of a Cartesian X, Y and Z coordinate system will be established that represents the primary locating point of the body-in-white as built, that is, including the inherent tolerance variations and distortions caused by the framing and welding operations.

Located alongside each of the position detecting apparatus is a master locating pin which, after the position detecting apparatus is locked in place, is moved into an overhead input socket suspended from the gantry frame. The socket is part of a lever and crank system that is slidably attached to the overhead gantry of the master station. The socket on either side of the vehicle body is placed at design intent position representative of the locating points that each of the position detecting apparatus on either side of the vehicle body is intended to find. As the locator pins plug into the input sockets, the lever and crank arrangement, through bearing and ways structure, slides along the ways in both X and Y direction as will be explained hereinafter on the gantry in order to establish a new X and Y centerline between the two input sockets. This new centerline takes into account the variations and distortion of the body-in-white in the as built condition. Spaced a known distance from the center of the bell crank system is a second set of output sockets fixed directly to the base plate to which the input sockets and bell crank balancing mechanism is also fixed. As the input sockets, through the bell crank arrangement, move in both X and Y directions the output sockets move accordingly. After the lever and crank mechanism has established new X and Y directions the output sockets plug into a locating pin on a second position detecting apparatus which is part of the tooling attached to the master locating station. Through the socket and pin interaction of the second position detecting apparatus the complete tooling fixture is floated into place with respect to the newly found X, Y and Z coordinate system for the actual body as built, including the distortions and tolerance stack up error inherent in the framing and welding of the body-in-white. After the tooling stations on either side of the body-in-white are caused to move into a position relative to the new centerlines (X, Y and Z) established by the bell crank system, the tooling system and associated position detection apparatus are located in place and work can be performed on the body-in-white. Since the sockets provide a locating position in both the X and Y direction the new centerline in the fore/aft of the body-in-white as well as a cross-car centerline between the two locating references on either side of the body are maintained while work is performed. Accordingly, any misalignment between the two front position detecting apparatuses from one side of the vehicle to the other will be balanced out to generate a new centerline at half the distance of the overall cross-car dimension defined as the Y direction including the misalignment. Further, any error in the cross-car dimension of the two locating points will also be balanced out by the overhead socket so as to generate a new centerline in a direction ninety degrees to the car cross dimension defined as the X direction. The third plane of the Cartesian coordinate system is established by providing similar socket arrangements in a direction ninety degrees to the overhead sockets so that the pin attached to the position detecting apparatus can locate into an input socket and an output socket will cause the tooling to float to a new net position in the Z direction, with respect to the body in order to balance any error in the Z direction from design intent, and establish the new third plane of the new X, Y and Z Cartesian coordinate system for the body-in-white. Once the new coordinate system has been established for the vehicle as built, the complete tooling system is locked into place and any number of additional position detecting apparatuses or units using a pin and socket arrangement locating scheme may be used in conjunction with work performing devices in order to perform work on the vehicle body to provide the necessary attachment features for the various outer body panels or attachment devices intended to be attached to the body-in-white in further processing of the vehicle body. As a result of being able to balance out any created or inherent errors of the body-in-white due to processing through the framing station, all attachment holes, slots, pads etc. created by the work performing devices of the master locating station can be located with respect to the newly established X, Y and Z coordinate system and therefore all locations of the attachment features are net to the newly created X, Y and Z coordinate system. Furthermore, the new mastering scheme creates the absolute best fit attachment feature and completely eliminates the need to provide for a slip plane in order to attach a component to the body-in-white. Therefore any outer body component, i.e. hood, fender, doors, decklid, liftgate, front bumper, rear or front facia etc. being attached to the body-in-white can be fabricated with attachment feature at net or design intent positions since they will be attached to a net attachment point on the body-in-white. Upon accomplishing all of the work earlier established to be necessary in this particular master work station the position detecting apparatus and its associate tooling will unlock from the vehicle body and retract to a rest position so that the body can continue to be processed along the assembly line.

The invention also encompasses a method for establishing a new Cartesian X, Y and Z coordinate system taking into account the inherent error created by assembling the various panels of a vehicle body in a framing and/or welding station.

The method of establishing a new coordinate system taking into account the variations of the vehicle body upon which work is to be performed is set forth. The method also encompasses the performance of work on the vehicle body at a location remote from a plurality of independently established primary locating points.

The principle object of the present invention is to provide a new and improved apparatus and method for establishing a new Cartesian X, Y and Z coordinate system for a vehicle body otherwise known as a body-in-white. The invention encompasses performing work at this new X, Y Z coordinate or grid system so as to provide net attachment features for the various components that will subsequently be attached to the body-in-white.

Another object of the present invention is to provide a new and improved apparatus and method of balancing out the inherent error generated by the processing of the body-in-white through the framing and welding operations.

A further object of the present invention is to perform work on a body-in-white relative to a newly established X, Y Z coordinate system so as to provide new net attachment features for the various outer body panels and/or attachments to be made to the body-in-white.

Still another object of the present invention is to provide an apparatus that can interact with a body-in-white and generate a new reference position with respect to known design intent reference positions, balance out any errors at this given reference position and establish a new reference coordinate system for the body-in-white so that, thereafter, work can be performed on the vehicle body at a location remote from the established reference position.

Another object of the present invention is to provide an apparatus that relies primarily on a fluid drive device and mechanical interactions for accomplishing part of its motion relative to an adjacent workpiece.

Also, another object of the present invention is to provide an apparatus that has freedom of movement in at least three dimensions to locate and lock on primary locating points of unknown dimensions and thereafter reestablish a new net X, Y and Z coordinate system for the primary locating points that is used, in turn, by the associated tooling to perform work relative to the new net X, Y, Z coordinates on the vehicle body to create attachment features for outer panel components thereafter intended to be attached to the body-in-white.

Another object of the present invention is to provide a method for the manufacturer of attachment features on a vehicle body-in-white structure that are created with reference to a newly established X, Y and Z coordinate system based on balancing out the inherent errors existing in the body-in-white from the framing and welding operations.

Yet another object of the present invention is to provide an apparatus that has attached thereto a work performing tool net located to a newly established X, Y and Z coordinate system for the object whereafter the tool is located and held by the apparatus for a time interval sufficient to permit the tool to accomplish its task and be withdrawn from the proximity of the object being worked on.

Yet another object of the present invention is to establish attachment references on a body-in-white without the use of slip planes.

Still a further object of the present invention is to provide an apparatus for reforming an element of an automotive inner body panel to present a portion of the surface of such element at a predetermined net position with respect to a newly generated X, Y and Z coordinate system for the attachment of an outer body panel thereto.

It is a further object of the present invention is to provide an apparatus and method for establishing a new X, Y and Z coordinate system of an automotive inner body panel to present a portion of the surface of such element at a predetermined position for the attachment of another element thereto and for forming a net hole in such surface to facilitate the attachment of the element thereto.

For a further understanding of the present invention and the objects thereof, attention is directed to the drawings and the following brief descriptions thereof, to the description of the preferred embodiment of the invention and to the claims.

DETAILED DESCRIPTION OF THE INVENTION

Generally shown in the Figures, is a method and apparatus for utilizing position detection apparatuses to locate primary locating points on a vehicle body, also known as a body-in-white. In accordance with the present invention, after the primary locating points have been located and the position detecting apparatus have been locked in place, a set of locator pins and input sockets, one of which is attached to the position detecting apparatus and the other of which is attached to a balancing lever mechanism fixed to the gantry spanning the production line, is used to balance out or average the deviation of the primary locating points in cross-car, fore/aft and up/down directions of the actual body-in-white as built, from design intent positions. This average or balancing out would obviously not be required if the processing of the body-in-white resulted in all panels and attachment points being actually located at design intent position after the vehicle body was processed through the framing and welding station. Unfortunately, a perfect body-in-white exists only in sophisticated CAD systems on a computer. In the real world, bodies-in-white are made with a variety of assembled parts, each having tolerance variations resulting in tolerance stack-ups. Further, the effect of as many as three thousand (3000) welds make it impossible to predict the final assembled location of any point on the body-in-white with any great specificity. Accordingly, tolerance variations of any point on the body-in-white after processing are expected, and acceptable within a given tolerance range. The invention contemplates balancing out these unknown variations and therefrom create a new known X, Y and Z coordinate system or grid for the body-in-white in the "as built" condition. A second set of output sockets and locator pins, one of which is mounted to the balancing mechanism, the other being mounted to a second position detecting apparatus associated with the tooling surrounding the body-in-white, interact or plug into each other to float the tooling station into a net position with respect to the newly created coordinate system, created by the balancing technique, so that work may be performed on the body-in-white relative to a new net X, Y, Z coordinate system of the body-in-white.

In the context of the following detailed description of the preferred embodiment, which is a vehicle body for an automobile, reference to the fore/aft (X), cross/car (Y), and up/down (Z) axis, as well as the relative terms front, rear, top and bottom, apply to a vehicle body as viewed in the final assembled position unless otherwise specified. Also, reference to a "Class A" surface means any surface on the completely assembled automotive vehicle body that is visible to an observer.

Figure 1:
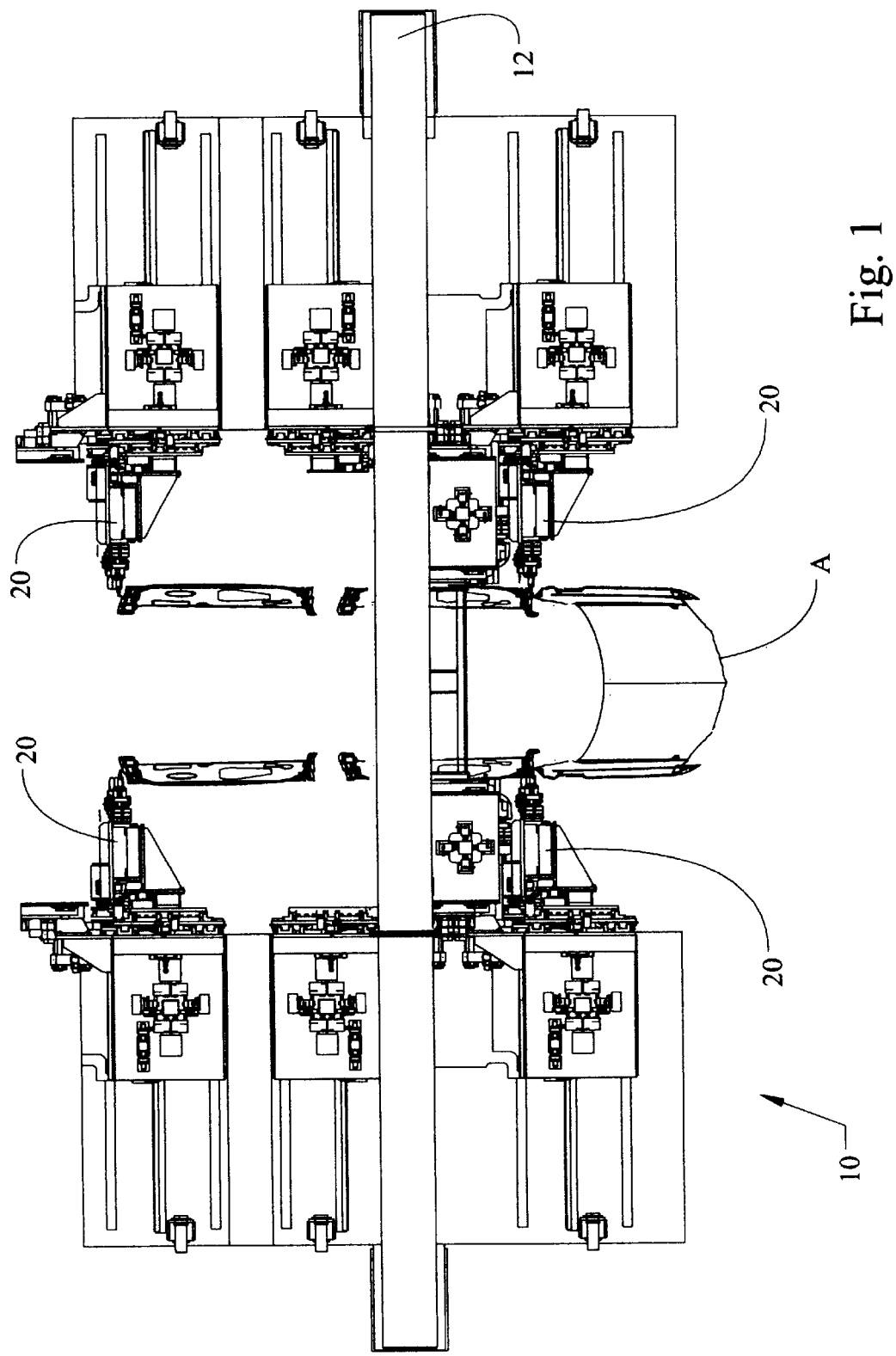
FIG. 1 is a top view of a partial body-in-white located in the preferred embodiment master locating station with a gantry and wherein the tooling has been removed in order to clearly view the position detecting apparatuses, the front two of which are engaged with the vehicle body.

With reference now in detail to the Figures, FIG. 1 shows a portion of a body-in-white A in a master locating station 10 having a front gantry 12 and rear gantry (not shown) with appropriate position detecting apparatuses 20 located selectively at four feature points or primary locating points (not shown) on the body-in-white A so as to find the actual location of unknown primary locating points on the body-in-white and thereafter immobilize the position detecting apparatuses 20 with respect to the primary locating points of the body-in-white A. It is understood that the primary locating points selected can change based on the requirements of the specific vehicle as well as what subjectively may be determined by the body building team to be important features that need to be properly fit for gapping or flushness, or relative importance, as a feature line across the complete body side of the vehicle body.

The position detecting apparatus selected 20 is described in detail in Dacey Jr., U.S. Pat. No. 4,813,125 owned by the assignee hereof and that is incorporated herein by reference in its entirety. For the purpose of clearly understanding the current invention, some limited description of the position detecting apparatus 20 is provided. The apparatus as described in U.S. Pat. 4,813,125 includes a fixed base structure for rigid mounting to a floor adjacent to an assembly line, a transfer platform is movably attached to the base structure so that the transfer platform can move in a horizontal direction with respect to the fixed base structure. A support structure assembly in the form of an angle plate is mounted to the transfer platform that in turn is adapted to move in a horizontal direction perpendicular to the direction of movement of the transfer platform. A vertical slide assembly is movably mounted to the angle plate of the support structure and movable with respect thereto in a vertical direction. Fluid actuated positioning and locating members are attached to the apparatus to permit limited movement with respect to all three directions, that is X, Y and Z directions and further includes a device for immobilizing the horizontal and vertical movements of the apparatus. A plurality of probes and/or contact blocks are attached to the position detecting apparatus for locating selected pre-established reference surfaces or primary locating points on the vehicle body so that the position detecting apparatus can move into position at the primary locating points in order to "find" the location of these points in an X, Y and Z coordinate system within a known tolerance range. Although the position detecting apparatus 20 selected is a mechanical device, it is within the scope of the invention that vision systems, electro-optical or other suitable sensors, or lasers in combination with robotic tools may be used to detect the position of selected primary locating points on a body-in-white.

Figure 2:
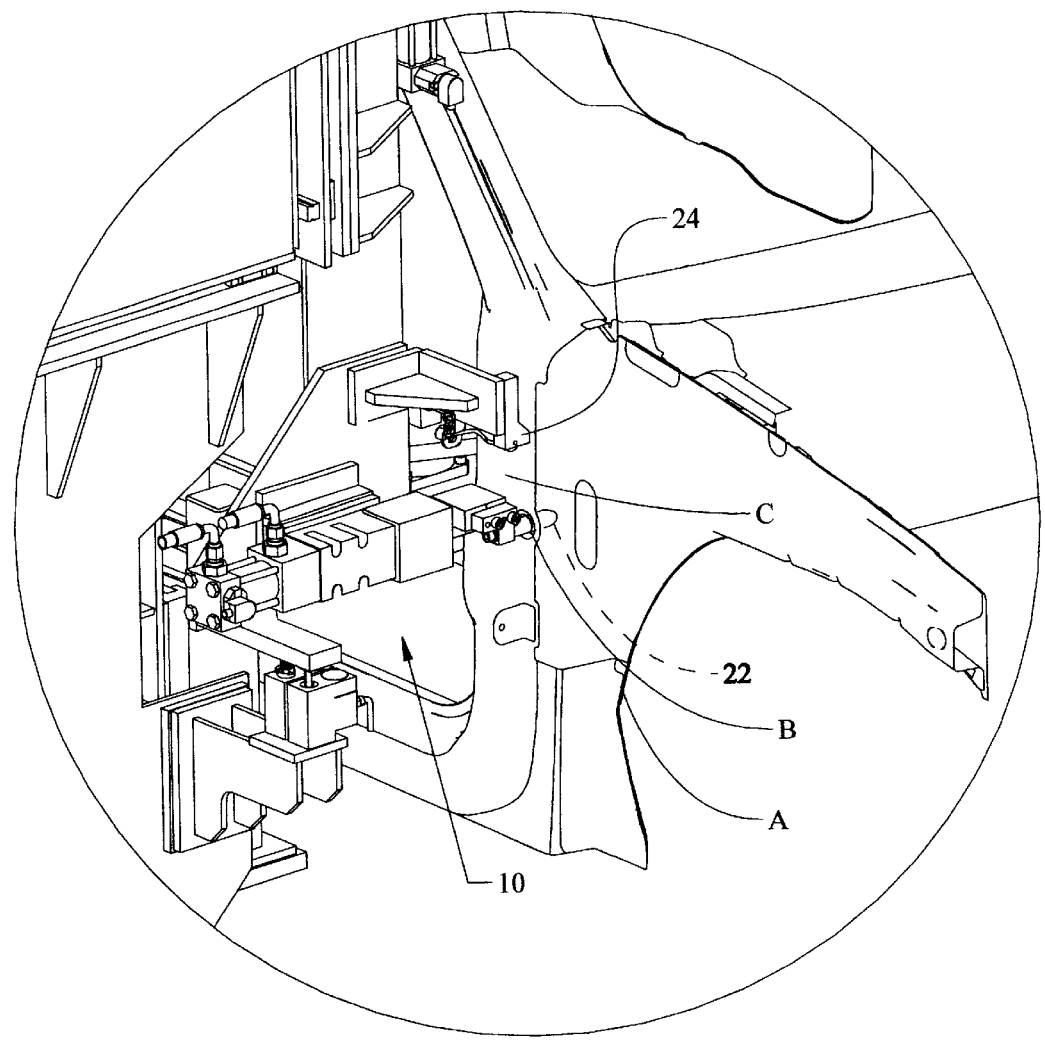
FIG. 2 is a partial isometric view of the position detecting apparatus located in the front right hand primary locating points of the vehicle shown in circle 2 of FIG. 3.

As shown in FIG. 1, the position detecting apparatuses 20 are located on each side of an assembly line spaced with respect to the body-in-white A that will be processed therethrough. For purposes of clarity the rear gantry spanning across the production line and all of the associated tooling are not shown and further, the complete body-in-white A is not shown so as to enable viewing the position detecting apparatuses 20 in the front and the rear of the master locating station 10. FIG. 2 is a close up of the right front quarter of the vehicle body A being processes wherein the position detecting apparatus 20 has been isolated and illustrates a probe 22 located in a gage hole in the front pillar, defining a primary locating point B, to establish X and Z positions as well as a contact block 24 touching the vehicle in order to establish a cross-car or Y position of a Class A surface C on the front pillar.

The contact block 24 is adapted to carry a low DC voltage so as to electrically sense contact with the pillar surface to avoid creating an external force on the vehicle body A that could influence the position or location of the Class A surface. The position detecting apparatus 20 moves into position against the body-in-white A to establish a cross-car location by touching the contact block, and a fore/aft X and up/down Z location by locating in the gage hole B. After each of the position detecting apparatuses 20 as shown in FIG. 1 have moved into place by finding their respective primary locating point on the vehicle, the position detecting apparatuses 20 are immobilized according to the teachings of Dacey Jr. To a person skilled in the art it should be obvious that in order to establish the immobilized position of all four position detecting apparatuses 20, the vehicle body A must come to a complete stop position in the master locating station 10. The body-in-white A enters the master locating station 10 located on the same primary locating points as established in the framing system. These primary locating points are the same points used to locate the body throughout the body shop operations as well as in the body inspection room and generally includes locating on each of the rails, a four way locating pin forward and a two way locating pin rearward. The body-in-white A is then clamped in place and remains at the clamped position throughout the master locating stop station and subsequent assembly stations.

Figure 3:
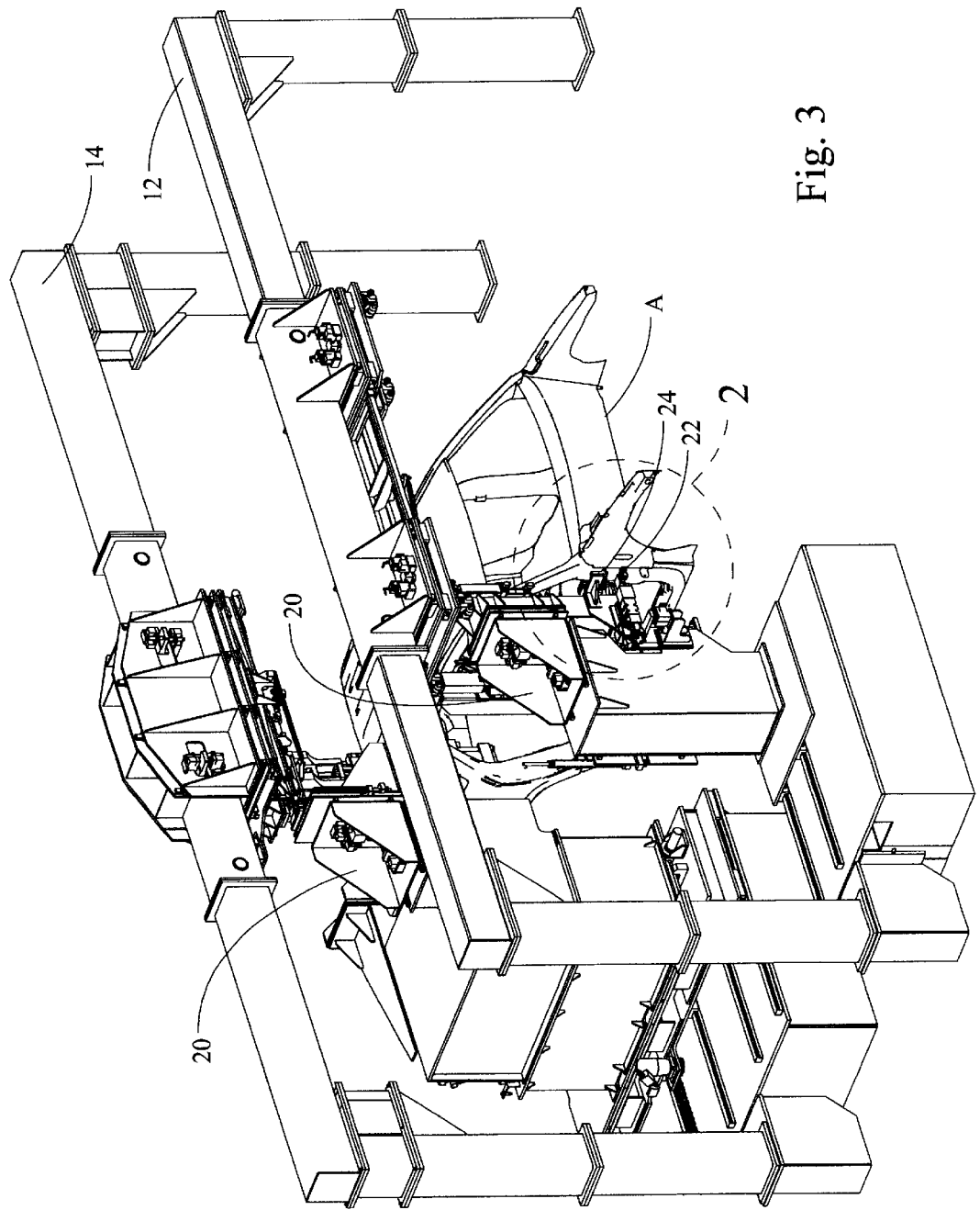
FIG. 3 is an isometric view of the master locating station with the right side position detecting apparatuses located on the right side primary locating points and the left hand position detecting apparatuses and all associated tooling removed.

For the purpose of clarity, and with reference to FIG. 3, there is shown a master locating station 10 with the appropriate gantries in the front 12 and rear 14 of the vehicle body that straddle the production line as well as the position detecting apparatuses 20 used to locate on the right hand side of the vehicle. The remaining position detecting apparatuses are not shown for the purpose of clarity. However it is understood that the following discussion of the operation concerning the right front quarter position detecting apparatus 20 equally applies to each of the position detecting apparatus 20 in the creation of a new X, Y and Z coordinate or grid system based on the vehicle as built with the aforementioned variations, distortions and inherent processing errors. The work performing tools are also not shown in FIG. 3.

FIG. 3 represents a master locating station 10 that includes a gantry 12 at the front of the body wherefrom is suspended a lever and crank centering mechanism 30 that can move fore/aft (X) and cross-car (Y) on a slide assembly 50 utilizing a plurality of bearings and ways in order to be moved in the fore/aft and cross-car directions for a purpose hereinafter described. As shown in FIGS. 2 and 3, the position detecting apparatus 20 has been moved in place by the insertion of the probe 22 into a primary locating point or gage hole B in the body pillar as well as by a contact block 24 creating contact with the vehicle Class A surface C so as to find and locate the exact position of the selected primary locating point for the front quarter panel of the vehicle body. The position detecting apparatus 20 has been immobilized and is locked in this position. Since all position detecting apparatuses 20 operate simultaneously in order to establish the location of all of the primary locating points on a vehicle body, once immobilized, all four apparatuses 20 are now positioned with respect to selected primary locating features on the processed body-in-white A. As recognized by any person skilled in the art, the primary locating points will vary between vehicle platforms and due to the distortions and stack up tolerances created in the framing and welding station, the position of the Class A surfaces will also vary from body assembly to body assembly and even from side to side of the same vehicle body, as will be illustrated hereinafter.

Figure 4:
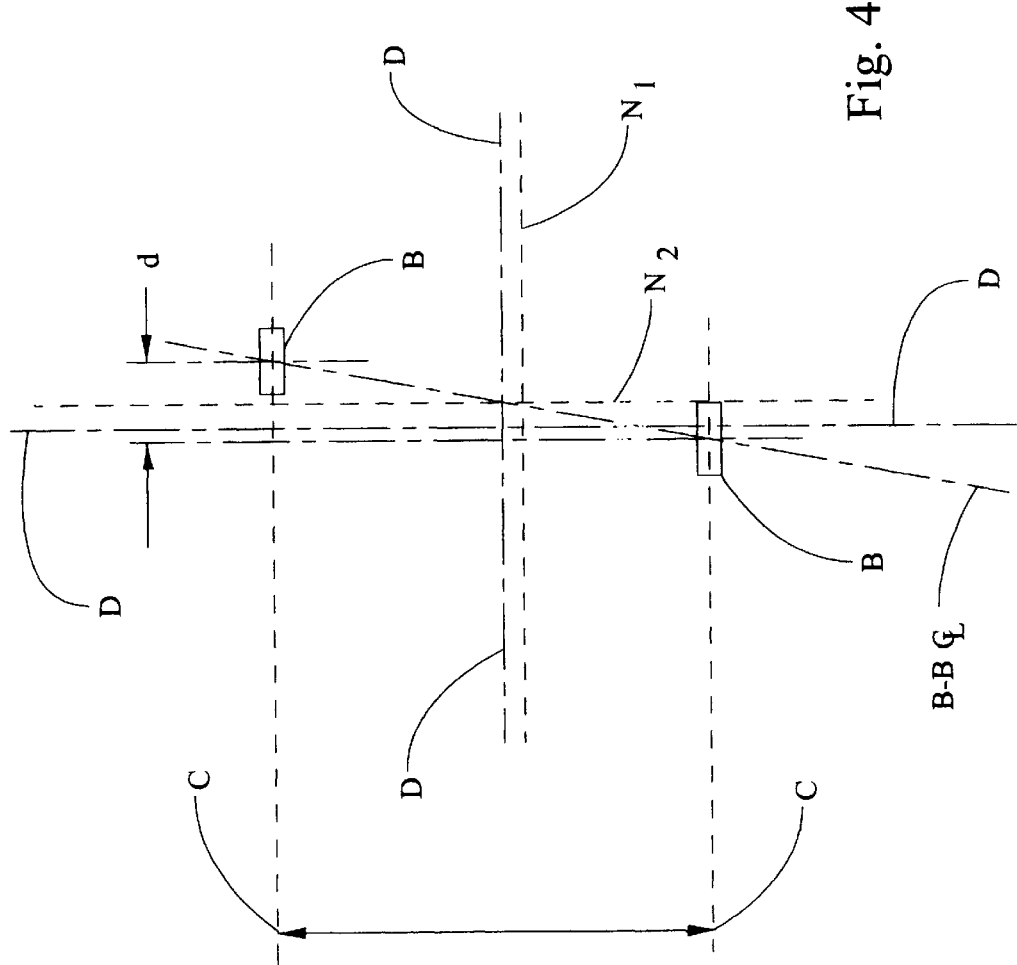
FIG. 4 is a schematic representation of the top view of the front primary locating points misaligned from design intent due to the influences of the work performed on the body-in-white in the framing/welding station.
Figure 5:
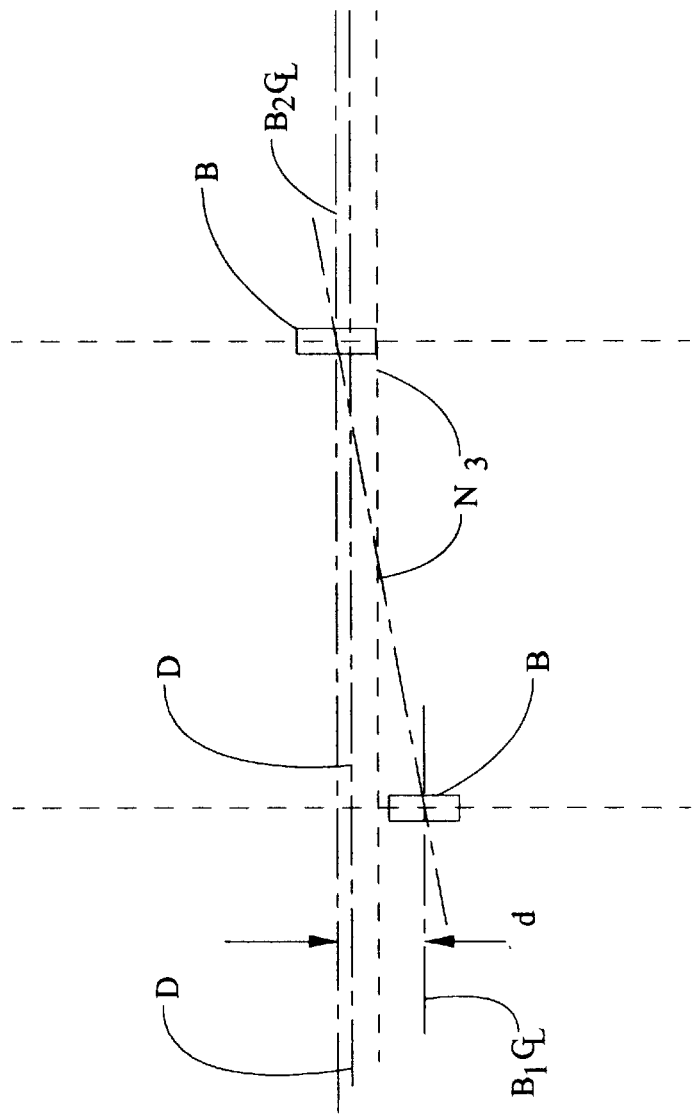
FIG. 5 is a schematic representation of a misalignment of the front primary locating points as viewed from the rear of the vehicle body so as to show the misalignment in the up/down direction of the primary locating points.

For the purpose of illustrating the invention, and with reference to FIG. 4, once the position detecting apparatuses 20 are immobilized, the representation conceptually in FIG. 4, as viewed from the top of the vehicle body A, reflects the position of the right hand position detecting apparatus 20 as shown in FIG. 3 located at the primary locating point B, C in a direction fore/aft further rearward from the position detecting apparatus 20 located on the left hand side of the vehicle body A. From this, it can easily be concluded that the body-in-white A, as a result of distortions by processing through the framing station has moved. As a result, the gage hole B and associated cross-car centerline B—B C (between the two primary locating points B, B has moved rearward from the cross-car design intent centerline D while the gage hole B and associated centerline B—B C on the left hand side has moved forward from the design intent position D. Also, in the cross-car direction, the contact blocks from left to right hand side have detected a shift in the class A surface of the pillar since the right hand side surface is further inboard from design intent while the left hand Class A pillar surface is further outboard from its design intent position as reflected by the cross-car design intent centerline D. Similarly, FIG. 5 represents a conceptual view of the two front position detection apparatuses 20 located in the master gage hole B, as viewed from the rear of the vehicle body. The centerline $B_1$ C of the primary locating feature B on the left hand side is substantially lower than the centerline $B_2$ C of the master gage hole B on the right hand side of the vehicle body. The obvious reason for this is the fact that the body-in-white A, as processed through the framing and welding station, has inherent variations and distortions in the various panels in which these primary locating points are located and accordingly, these primary locating points are not at design intent position D nor in any way representative of the X, Y, Z planes or grid lines about which the design intent body is designed. It is clear that the body-in-white A, due to its processing, has somehow been skewed in the FIG. 4 and FIG. 5 schematic representations. Any outer panel that references these points B, B as currently depicted in FIG. 4 and FIG. 5 will naturally require fit and spacing adjustments to adjacent body panels and this clearly shows why in the past, a slip plane had to be used in order to allow adjustment of these panels because of the unknown variations of the primary locating points for attachments to or referencing of the outer body panels.

The invention contemplates adjusting the tooling with respect to adjusted averaged newly established X, Y and Z reference planes created by averaging out the distance d between right B and left B primary locating point as viewed in FIG. 4 or FIG. 5 so that the tooling can utilize this new adjusted average X, Y and Z grid positions to establish a new net reference location and perform work with respect thereto. The net effect of this averaging results in reducing total deviation error from design intent to one-half, as well as to establish an actual net location of the "as built" body-in-white A and utilize the newly established X, Y and Z coordinates as a new grid system from which to reference the tooling so that new net attachment points can be provided on the body-in-white A enabling the attachment of components to the vehicle body at the new net attachment point without the need for oversized holes or a slip plane.

Figure 6:
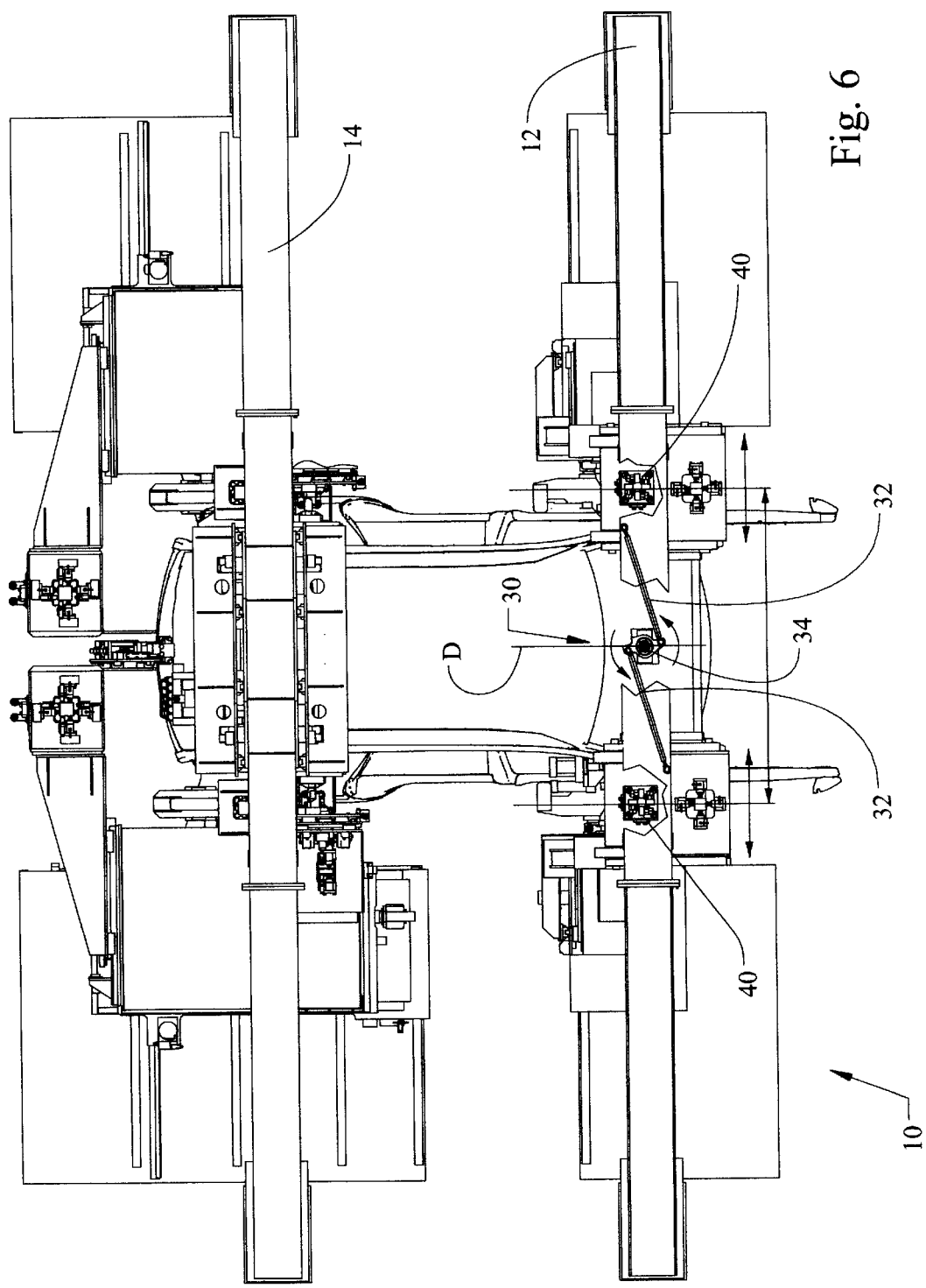
FIG. 6 is a top view of the master locating station with a portion of the front gantry cut away to better illustrate the attachment of the balancing lever and crank mechanism to the underside of the gantry spanning the production line.
Figure 7:
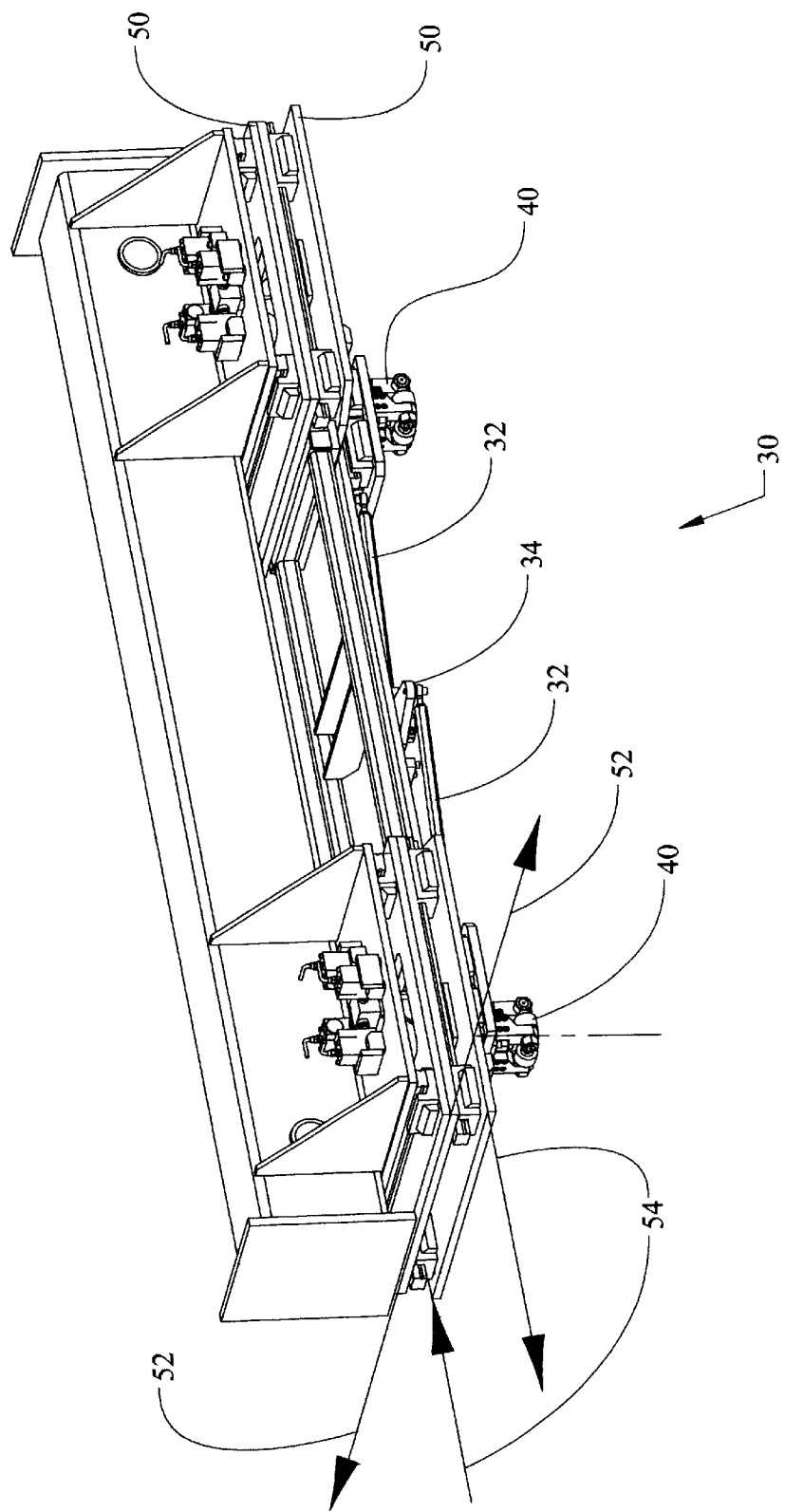
FIG. 7 is a partial view of the gantry spanning the production line, having the level and bell crank system attached to the bearing and slide mechanism that is secured to the underside of the gantry.

The new net locating X, Y, Z coordinate system is established through the use of a lever and crank mechanism 30 that is attached to each gantry 12, 14 for respective fore/aft and cross-car final positioning of attachment points. With reference to FIGS. 6 and 7, there is shown the lever and bell crank system 30 encompassing a crank arm 34 located at the exact design intent centerline D of the vehicle to be processed with attached sockets 40 located at the end of each 32 lever having one end attached to the socket and the opposite end attached to the crank arm 34. The lever and crank system 30 is biased in the clockwise direction so that the cross-car dimension between sockets is less than the design intent dimension, by an amount corresponding to the acceptable total deviation range so as to always insure that the socket is within range of a locating pin to be moved into it, as hereinafter described.

Figure 8:
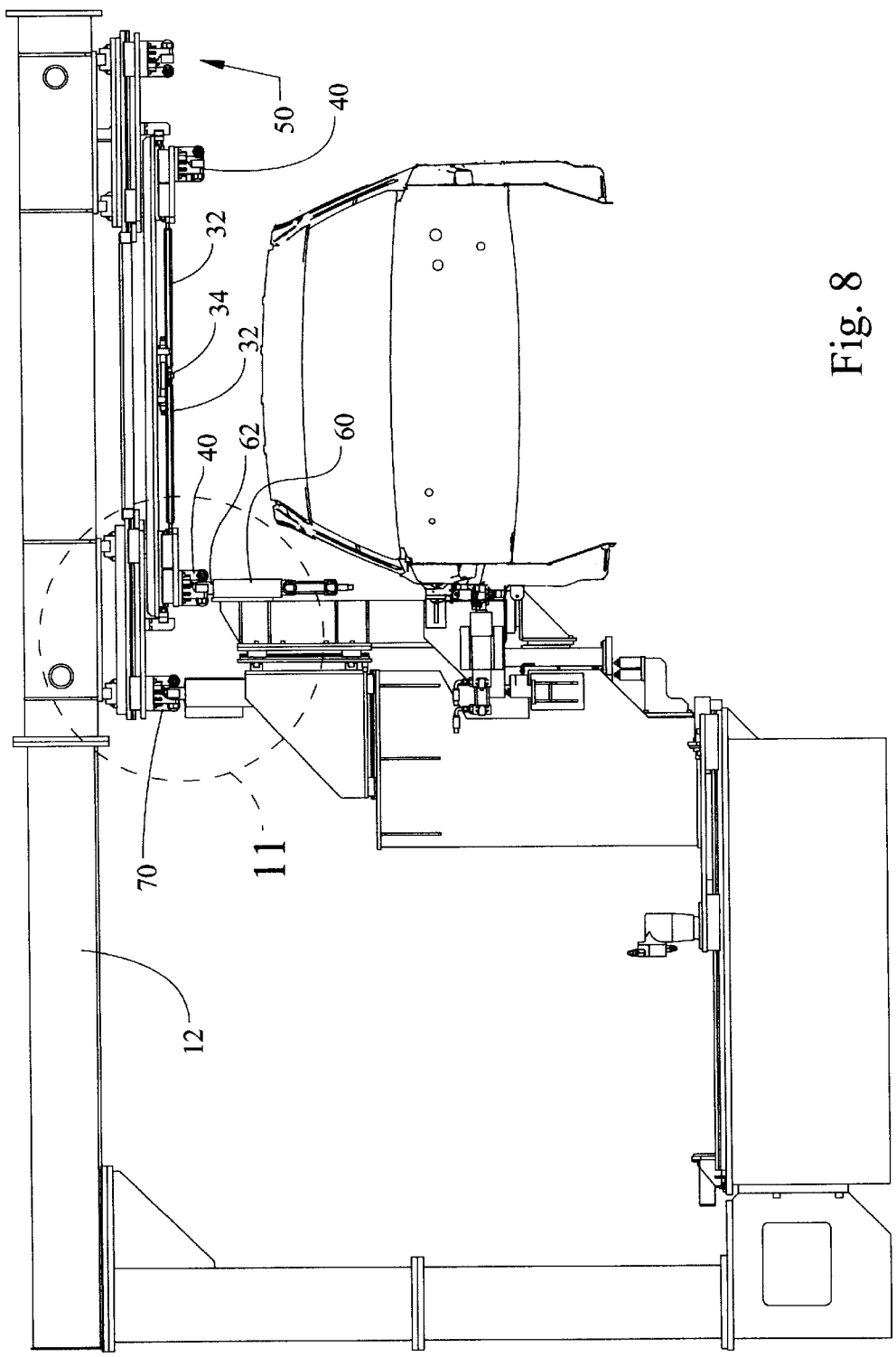
FIG. 8 is a front end view of the master locating station with the right side front position detecting apparatus, probes, and contact block locked in place and the associated locator pin inserted in the overhead socket to establish the location of a new X, Y, and Z coordinates for the primary locating points of the vehicle body.
Figure 9:
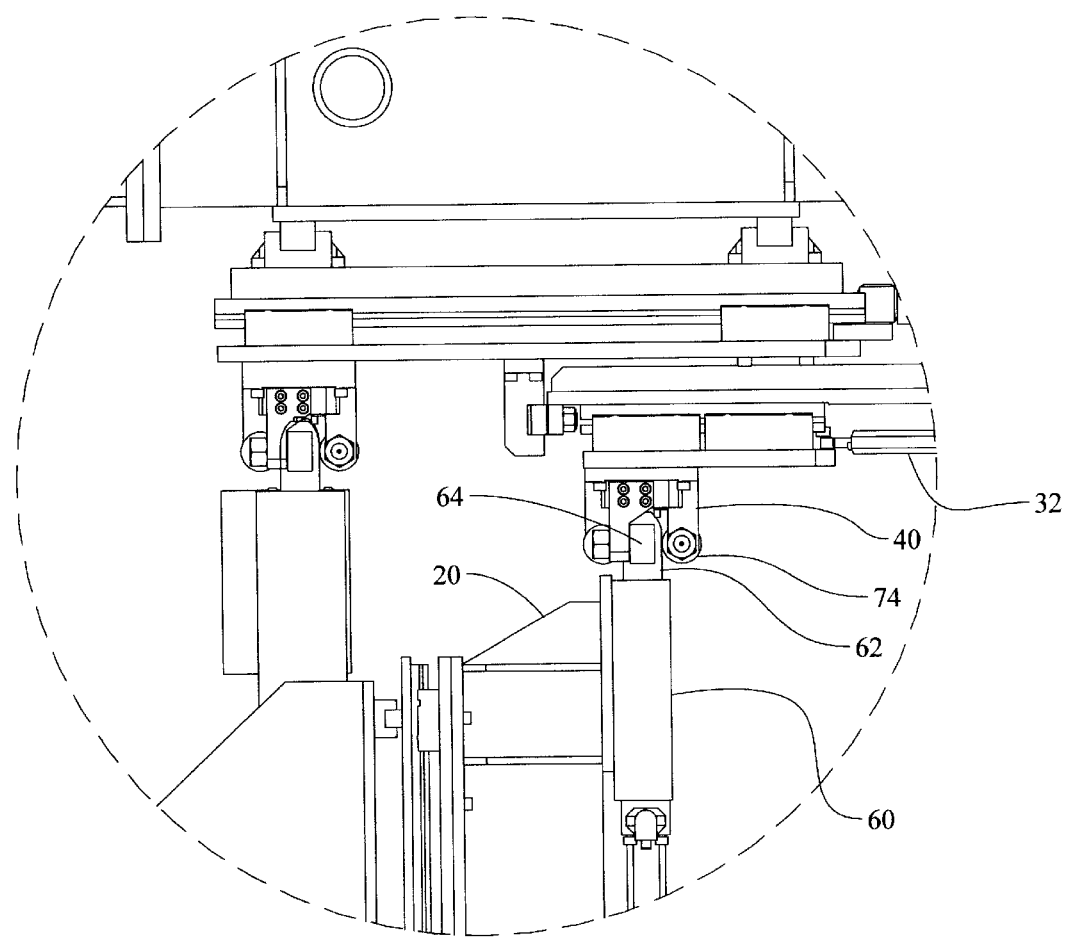
FIG. 9 is a detailed view of only the input socket arrangement attached to the end of a lever of the bell crank system with the locator pin in the bottomed-out position as shown in circle X of FIG. 8.
Figure 10:
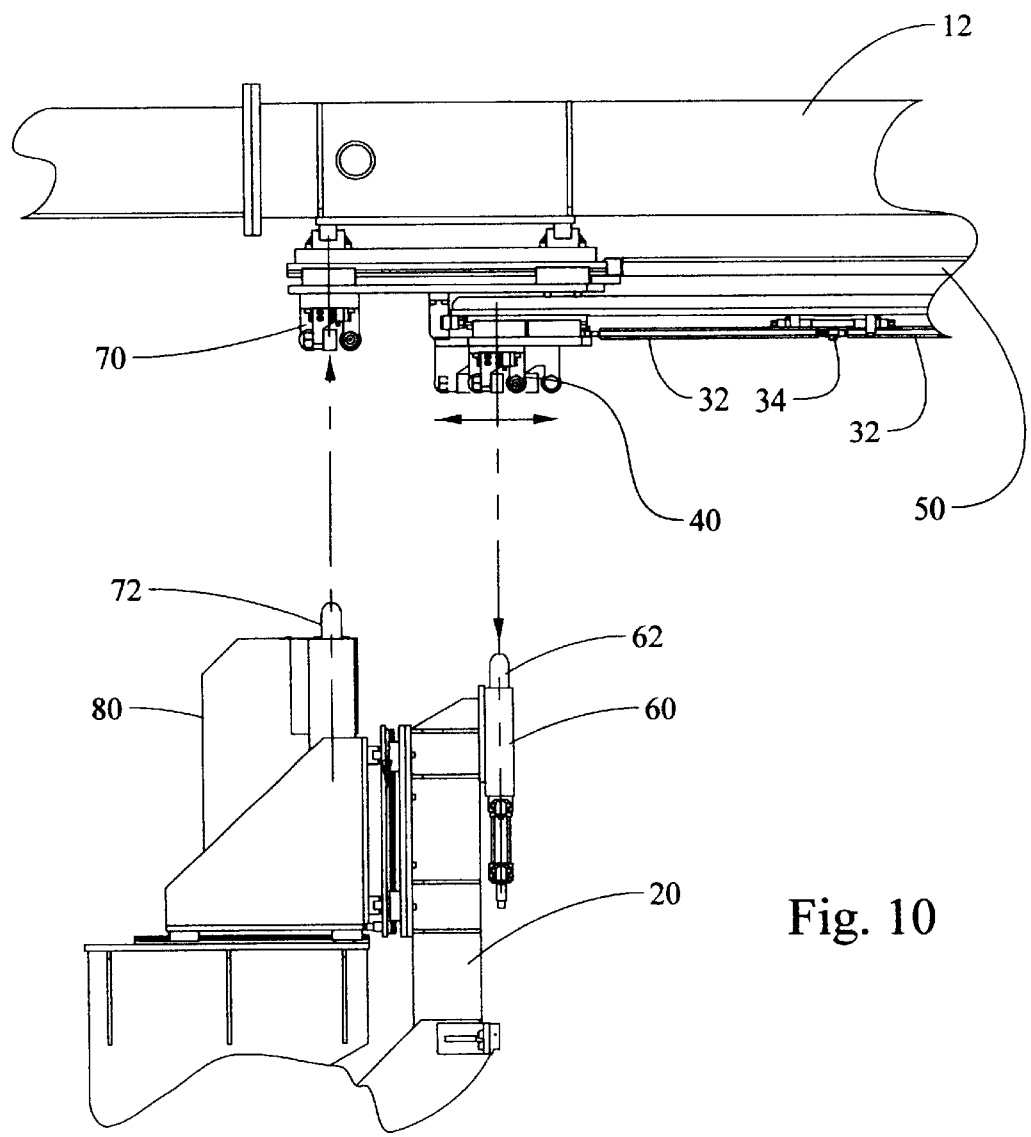
FIG. 10 is a partial view of the master locating station highlighting the lever and bell crank centering arrangement, having an input and output socket attached thereto with the respective locator pin aligned with a first position detecting apparatus and additional locator pin aligned with a second position-detecting apparatus.
Figure 11:
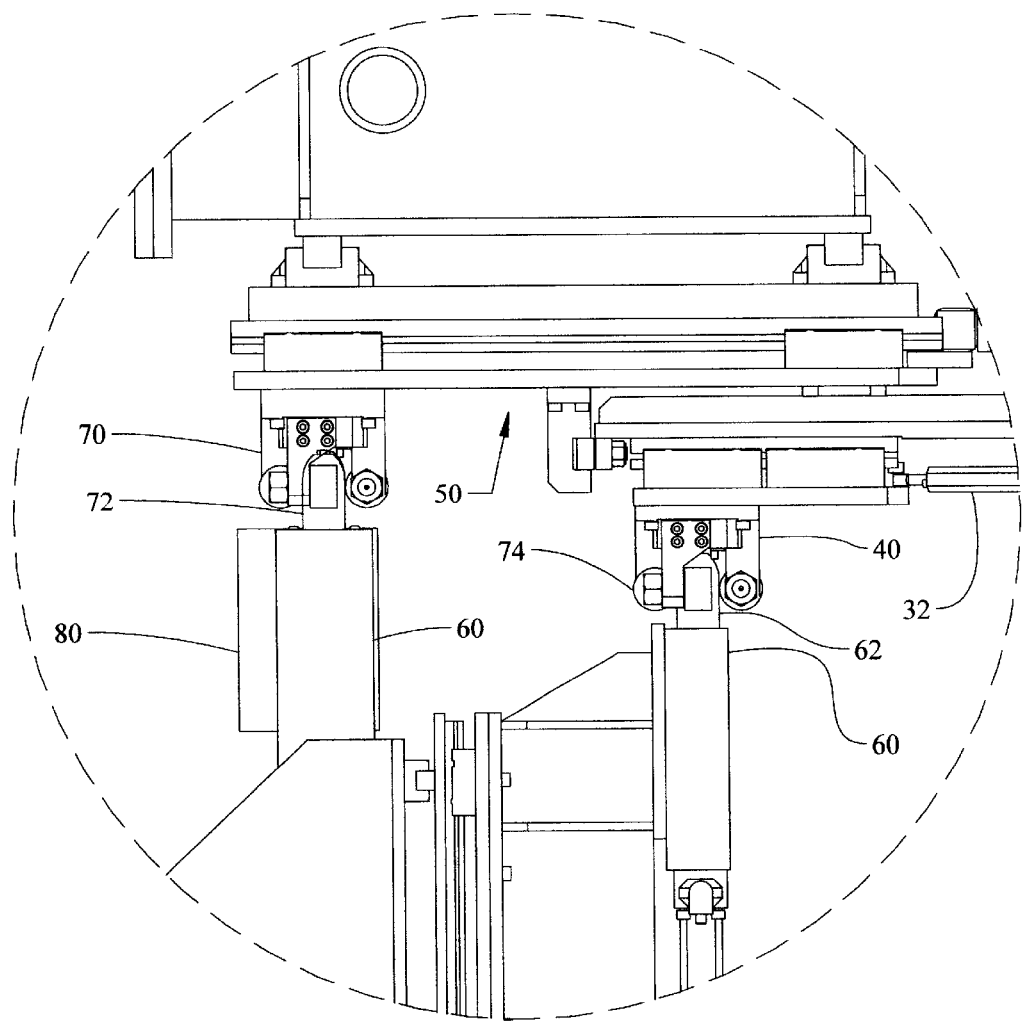
FIG. 11 is a detailed view in the fore/aft direction from the front of the vehicle body of both input and output sockets with locator pins bottomed-out as shown in circle 11 of FIG. 8.
Figure 12:
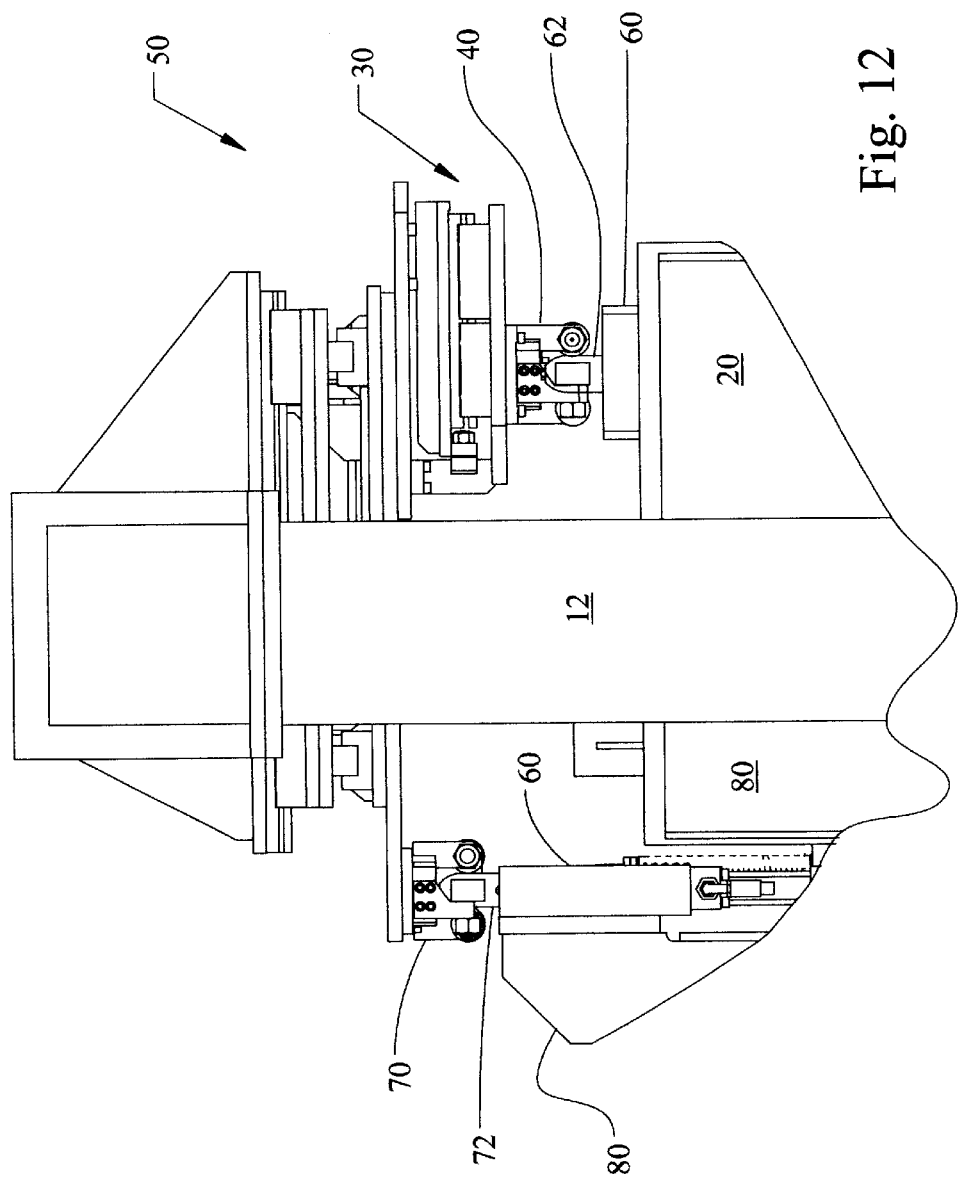
FIG. 12 is a partial view in the cross-car direction of the bearing and slide mechanism and associated input socket attached to a position detection apparatus and output socket attached to another position detecting apparatus directly attached to the tools which perform work on the vehicle body.

Referring to FIG. 8, the first set of sockets 40, are mounted on a bearing and a slide assembly 50 that is movable in the fore/aft direction 52 as well as cross-car direction 54 of the complete lever and crank system. The position detecting apparatus 20 communicate with the bell crank system 30 through the use of a locating pin 62 and cylinder 60 arrangement securely fixed to an opposite end of the position detecting apparatus 20. The locating pin 62 can extend from the cylinder 64 in an upward direction. As the locating pin 62 extends toward and into the socket 40, a set of rollers 74 (shown in detail in FIG. 9) mounted 90° with respect to each other form a pocket to receive a bull nose of the locating pin 62 that continues to travel within the socket 40 until it bottoms out. Any effect of a misalignment between flats 64 on the locating pin and the socket 40 generates a force on the lever and bell crank 30 thereby creating rotation of the bell crank and lever system 30 and, at the same time, the rotation forces movement of the slides along the bearings of the slide assembly in the fore/aft 52 and cross-car 54 direction. Through the lever and bell crank mechanism 30, a balancing occurs between the two front sockets 40 mounted on either side of the body-in-white A. Similar balancing occurs between the two rear sockets (not shown). The total amount of movement is a function of the total deviation from design intent from which each of the primary locating points B have been moved to as shown in FIGS. 4 and 5 due to the framing/welding station processing.

As shown in FIGS. 4 and 5, the adjustment will be balanced between right and left sides because of the socket 40 and locator pin 62 interaction and by this balancing action, the bell crank and slide mechanism 50 will balance out at a new net cross-car position and in effect create a new centerline $N_1$ in the fore and aft, or X direction, based on actual vehicle body built conditions. Further, a second set of rollers (not shown) within the socket 40 also are influenced by the interaction of the locating pin 62 to create movement of the bearing and slide system 50 in the cross-car direction to balance out at a new cross-car position and create a new cross-car centerline $N_2$ that is a net centerline for the actual vehicle body as built in the cross-car or Y direction. A third movement of additional locator pins inserted into associated sockets and related movement of the slide system to which the bell crank is attached is simultaneous in both the front and rear of the vehicle body A (not shown). Accordingly, when both locating pins 62 are fully inserted into the first set of input sockets 40, a new centerline for the body-in-white A, in the "as built" position, is created in the X and Y directions. A similar locating pin and socket arrangement (not shown) is provided in the up/down or Z direction of the vehicle with a similar crank and lever mechanism to accomplish a similar balancing affect (not shown) so that a new centerline $N_3$ or net locating line for the Z direction is established as illustrated in FIG. 5. Upon complete insertion of the locating pins 62, in their respective sockets 40, a limit switch detects the presence of the pin 62 and securely locks the pins 62 in place in the first input sockets 40.

Now that the variation of the inherent errors of the processing of the body-in-white has been balanced out or averaged across a new set of X, Y and Z centerlines, as discussed above, and the locator pins 62 have bottomed out in their respective sockets 40 the work performing tools (not shown) can be brought into place to perform work on the body-in-white. This is accomplished by providing an additional set of sockets 70, commonly referred to as, output sockets as shown in FIGS. 8–12.

The additional set of output sockets 70 are physically attached to the same slide and bearing assembly 50 mounting plate as the first set of input sockets 40 attached to the bell crank and lever system 30. An additional position detecting apparatus 80, directly attached to all of the tools that surround the body-in-white A, is spaced relative to the first position detection apparatus 20. Accordingly, as the position detecting apparatus 80 floats to permit complete insertion of a locator pin 72 in the output socket 70 the tooling will relocate itself with respect to the new X, Y and Z gridlines for the body as built. This second set of sockets 70 receives the locator pin 72, of additional position detecting apparatus 80 located adjacent the immobilized position detecting apparatus 20. Since the output sockets 70 are fixed to the bearing and slide structure 50 as the locator pin 72 is located or floated into the fixed output sockets 70 the position detecting apparatus 80 floats in all 3 directional planes to allow the pins 70 to completely position itself and bottom out in the sockets 70.

As the position detecting apparatus 80 floats into place the complete tooling system directly or indirectly attached to the second position detecting apparatus 80 will also float so as to position itself net with respect to X, Y and Z coordinates and relative to the new centerlines $N_1$, $N_2$, $N_3$, based on the actual built condition of the body-in-white A. When the locator pins 72 bottom out in the output sockets 70, a signal is generated and communicated to the second position detecting apparatus 80 so as to immobilize this apparatus in this position thereby establishing a net location for all work performing tools relative to the new net coordinate system, that is, X, Y and Z that reflects the actual body as built wherein the total variations and distortions of the selected primary locating points have been averaged out to set a new net position from which tools can perform work on the body-in-white A.

The work to be performed on the body-in-white A and the sequence in which to perform the work can vary. Generally, a person skilled in the art will recognize that the speed at which this work is accomplished is a direct function of the access that is created for each of the work performing devices. The majority of the work concerns piercing holes for attachment of outer body panels such as doors, decklid, liftgate, bumpers, facia, hood, and fenders. However, it is also contemplated that attachment features can be established for head lamps, shock towers, tail lamps, fuel filler, instrument panel, seats, consoles and the like. All of the work performing tools operate under principles that need not be described herein.

While the method and apparatus of the invention has been described by way of illustration involving 4 position detecting apparatuses in conjunction with two lever and crank units to balance out and establish a new X, Y and Z reference coordinate system for a body-in-white, it is within the purview of the present invention to establish and immobilize any two or more position detecting apparatuses and an associated lever and crank balancing or averaging mechanism, thus, creating a new X, Y and Z grid system or reference planes from which useful work can be performed.

The invention including the method and apparatus as heretofore set forth may be embodied in other specific forms without departing from the spirit or essence of the invention. The presently disclosed embodiments are, therefore, to be considered in all respects as illustrative and not as a restriction on the invention, the scope of the invention being indicated by the appended claims. Rather the foregoing description and all changes that come within the meaning and range of equivalency of the claims are to be embraced therein.

What is claimed is:

1. An apparatus for creating net attachment features on a three-dimensional object defined by X, Y and Z Cartesian coordinates, said apparatus comprising:

A body having one end and an opposite end, each end of said body having at least one primary locating point thereon, said at least one primary locating point selectively located within a known tolerance range with respect to said X, Y and Z directions of said Cartesian coordinate system;

means for establishing the exact location of said at least one primary locating point on each end of said body, in each of said X, Y and Z directions, said exact location being defined as a datum position;

means for immobilizing said body at said datum position of each end of said body such that an imprecise distance is established between said datum position on said one end and said datum position on said opposite end of said body in each of said X, Y and Z directions;

means for creating a median point of said imprecise distance along each of said one end and said opposite end of said body, said median point of said imprecise distance on said one end and said opposite end of said body creating an adjusted net position of said primary locating point in one of said X, Y and Z directions on each end of said body; and means for locating at least one work performing device with respect to said adjusted net position whereby work performed on said body establishes at least one adjusted net attachment location for objects to be attached to said body.

2. The apparatus claimed in claim 1, wherein said means for establishing the exact location of said at least one primary locating point on each end of said body further comprising a front and rear gantry straddling a production line such that said body can pass through thereunder.

3. The apparatus claimed in claim 2, wherein said means for establishing the exact location of said at least one primary locating point on each end of said body comprises a first plurality of position detecting apparatuses, at least two of said first plurality of position detecting apparatuses being disposed on opposing sides of the said body.

4. The apparatus claimed in claim 3, wherein each of said first plurality of position detecting apparatuses each include at least a probe and a contact block.

5. The apparatus claimed in claim 3, wherein each of said first plurality of position detecting apparatuses have a first locating pin attached thereto.

6. The apparatus claimed in claim 3, wherein said means for establishing the exact location of said at least one primary locating point on each end of said body comprises a second plurality of position detecting apparatuses each having a second locating pin attached thereto, at least two of said second plurality of position detecting apparatuses being disposed on opposing sides of said body.

7. The apparatus claimed in claim 6, wherein each said lever and crank centering system comprises a second plurality of sockets, at least two of said second plurality of sockets being disposed on opposite sides of said body, said second plurality of sockets being adapted to engage said second locating pin of said second plurality of position detecting apparatuses.

8. The apparatus claimed in claim 2, wherein said means for creating a median point of said imprecise distance comprises a lever and crank centering mechanism fixed to each of said front and rear gantry straddling said product line.

9. The apparatus claimed in claim 8, wherein each said lever and crank centering mechanism comprises a first plurality of sockets, at least two of said first plurality of sockets being disposed on opposite sides of said body, one of said at least two of said first plurality of sockets being adapted to engage said first locating pin of a respective one of said first plurality of position detecting apparatuses.

10. The apparatus claimed in claim 1, wherein said body comprises a welded body-in-white.

11. A master locating apparatus for establishing a plurality of net attachment features on an imprecisely constructed three-dimensional body structure of unknown dimensional accuracy within a known tolerance range, relative to an X, Y and Z Cartesian coordinate system, said imprecisely constructed three-dimensional body structure adapted for attachment of one or more external members, said apparatus comprising:

at least one columnar member located adjacent said body;

at least two position detecting apparatuses located in spaced apart relation on opposing sides of said body structure, each of said at least two position detecting apparatuses further comprising:

means for engaging said body structure at one or more selected predetermined primary locating points to establish a datum in at least two-dimensional planes of said three-dimensional body structure on each side of said body structure when said body structure is therebetween said means for engaging extending in a direction away from said position detecting apparatus and toward said body structure; and means for immobilizing said means for engaging after said datum has been located such that an imprecise distance measured along one of said X, Y and Z coordinates is established between said datum of said engaging means for each of said at least two position detecting apparatuses;

means for creating a median point of said imprecise distance between said datum of said engaging means for each of said two position detecting apparatuses, said means for creating having a first portion attached to said at least one columnar member and the remaining portion attached to said at least two position detecting apparatuses, said means for creating said median point of said imprecise distance in one of said X, Y and Z coordinates defining an adjusted net location relative to a design intent location; and means for performing work on said body structure with respect to said adjusted net location.

12. The apparatus claimed in claim 11, wherein said means for engaging said body structure includes at least a probe and a contact block.

13. The apparatus claimed in claim 11, wherein said at least one columnar member comprises a front and rear gantry straddling a production line such that said body structure can pass through thereunder.

14. The apparatus claimed in claim 13, wherein each of said at least two position detecting apparatuses each have a first locating pin attached thereto.

15. The apparatus claimed in claim 14, wherein said means for creating a median point of said imprecise distance comprises a lever and crank centering mechanism fixed to each of said front and rear gantry straddling said production line.

16. The apparatus claimed in claim 15, wherein each said lever and crank centering mechanism comprises a first plurality of sockets, at least two of said first plurality of sockets being disposed on opposite sides of said body structure, said first plurality of sockets being adapted to engage said first locating pin of each of said at position detecting apparatuses.

17. The apparatus claimed in claim 16, wherein said at least two position detecting apparatuses comprises a first pair of position detecting apparatuses disposed on opposite sides of said body structure, and a second pair of position detecting apparatuses disposed on opposite sides of said body structure, each of said second pair of position detecting apparatuses having a second locating pin attached thereto.

18. The apparatus claimed in claim 16, wherein each said lever and centering system comprises a second plurality of sockets, at least two of said second plurality of sockets being disposed on opposite sides of said body structure, said second plurality of sockets being adapted to engage said second locating pin of a respective one of said second pair of position detecting apparatuses.

19. A method for assembling objects to a body, said method comprising the steps of:

moving a body having one end and an opposite end into an approximate location, each said end having at least one primary locating point thereon engaging said at least one primary locating point of each said end of said body with at least one position detecting apparatus and immobilizing said position detecting apparatus at said at least one primary locating point;

determining an imprecise distance between said at least one primary location point of said one end and said at least one primary locating point of said opposite end of said body in one of X, Y and Z directions of a Cartesian coordinate system;

creating a median point of said imprecise distance, said median point defining a new adjusted net position at said median point of said imprecise distance;

locating at least one work performing tool with respect to said new adjusted net position adjacent said body; and performing work on said body to establish a net attachment feature on said body for assembling at least one object at said net attachment feature of said body.

20. The method according to claim 19 further comprising the step of assembling and welding said body prior to the step of engaging said at least one primary locating point such that minimal additional variation is introduced after the position of said at least one primary locating point is established.

21. The method according to claim 19, wherein the step of engaging said at least one primary locating point comprises the step of providing each of said at least one position detecting apparatus with a probe and contact block, whereby said probe engages said at least one primary locating point to establish two of said X, Y, and Z directions, and said contact block engages said at least one primary locating point to establish the third of said X, Y, and Z directions.

22. The method according to claim 21, wherein the step of engaging said at least one primary locating point of each said end of said body with at least one position detecting apparatus comprises the step of engaging a first pair of primary locating points on said one end of said body with a first pair of position detecting apparatuses disposed on opposite sides of said body, and engaging a second pair of primary locating points on said opposite end of said body with a second pair of position detecting apparatuses disposed on opposite sides of said body.

23. The method according to claim 21, wherein the step of creating median point of said imprecise distance comprises the step of providing at least one lever and crank mechanism having a first plurality of sockets disposed on opposite sides of said body and a second plurality of sockets disposed on opposite sides of said body, and further wherein said step of creating a median point of said imprecise distance comprises the step of providing a first locating pin on each of said first plurality of position detecting apparatuses and a second locating pin on each of said second plurality of position detecting apparatuses.

24. The method according to claim 23, wherein the step of creating a median point of said imprecise distance further comprises the step of engaging said first plurality of locating pins with said first plurality of sockets.

25. The method according to claim 24, wherein the step of locating at least one work performing tool with respect to said new adjusted net position further comprises the step of engaging said second plurality of locating pins with said second plurality of sockets.

26. A master locating apparatus mounted alongside of the direction of travel of an assembly line for a three-dimensional body structure of unknown dimensional construction within a known tolerance range, said master locating apparatus comprising:

at least two columnar members in spaced apart relationship on opposite sides of said assembly line;

a support member having respective ends, one of said ends attached to one of said at least two columnar members, the other of said ends attached to the other of said at least two columnar members;

at least two position detecting apparatuses located in spaced apart relations on opposite sides of said assembly line to permit said assembly line to pass therebetween, each of said at least two position detecting apparatuses further having:

means for engaging opposing sides of said three-dimensional body structure at a plurality of preselected defined locations to establish a datum position in at least two dimensional planes of said three-dimensional body structure on each side of said three dimensional body structure when said body structure is between said engagement means, said means for engaging extending in a direction away from said position detecting apparatuses and engaging said body structure at said plurality of preselected defined locations to establish an imprecise distance in at least one of said two dimensional planes between said datum position on one side of said three-dimensional body structure and said datum position on said opposing side of said three dimensional body structure; and means for immobilizing said at least two position detecting apparatuses;

means for establishing a median distance point of said imprecise distance between said datum position on said one side and said datum position on said opposing side of said three dimensional body structure in said at least one of said two dimensional planes, said median distance point defining an adjusted net position of said three-dimensional body structure; and means for performing work on said three-dimensional body structure with respect to said adjusted net position.

27. The apparatus claimed in claim 26, wherein said three-dimensional body structure comprises a welded body-in-white.

28. The apparatus claimed in claim 26, wherein said means for engaging opposing sides of said three-dimensional body structure includes at least a probe and a contact block.

29. The apparatus claimed in claim 26, wherein said at least two columnar members comprise a front and rear gantry straddling a production line such that said three-dimensional body structure can pass through thereunder.

30. The apparatus claimed in claim 26, wherein each of said at least two position detecting apparatuses have a first locating pin attached thereto.

31. The apparatus claimed in claim 30, wherein said means for establishing a median distance point of said imprecise distance comprises a lever and crank centering mechanism fixed to each of said front and rear gantry straddling said production line.

32. The apparatus claimed in claim 31, wherein each said lever and crank centering mechanism comprises a first plurality of sockets, at least two of said first plurality of sockets being disposed on opposite sides of said three-dimensional body structure, one of said at least two of said first plurality of sockets being adapted to engage said first locating pin of a respective one of said at least two position detecting apparatuses.

33. The apparatus claimed in claim 32, wherein said at least two position detecting apparatuses comprises a first pair of position detecting apparatuses disposed on opposite sides of said body structure, and a second pair of position detecting apparatuses disposed on opposite sides of said body structure, each of said second pair of position detecting apparatuses having a second locating pin attached thereto.

34. The apparatus claimed in claim 32, wherein each said lever and crank centering system comprises a second plurality of sockets, at least two of said second plurality of sockets being disposed on opposite sides of said body structure, said second plurality of sockets being adapted to engage said second locating pin of a respective one of said second pair of position detecting apparatuses.

* * * * *

UNITED STATES PATENT AND TRADEMARK OFFICE
CERTIFICATE OF CORRECTION

PATENT NO. : 6,691,392 B2
DATED : February 17, 2004
INVENTOR(S) : Savoy et al.

It is certified that error appears in the above-identified patent and that said Letters Patent is hereby corrected as shown below:

<u>Title page, item [54] and Column 1, line 4,</u>
Title, kindly insert -- FRAME -- at the end of fourth line.

<u>Column 3,</u>
Line 35, kindly delete "of".
Line 49, kindly delete "DeReese" and insert -- DeRees --.

<u>Column 4,</u>
Line 31, kindly delete "DeReese" and insert -- DeRees --.

<u>Column 6,</u>
Line 32, kindly delete "pre established" and insert -- pre-established --.

<u>Column 7,</u>
Line 47, before "correction", kindly insert -- a corrected attachment point for assembling each of the outer body panels to the appropriate holes formed in the underbody and thereby maintain flushness of adjacent panels. Accordingly, each attachment point is selectively investigated as to deviation from mean and --.

<u>Column 8,</u>
Line 40, kindly delete "pre established" and insert -- pre-established --.

<u>Column 10,</u>
Lines 25, 35 and 56, after "Y," kindly insert -- and --.

<u>Column 11,</u>
Line 15, after "invention", kindly delete "is".
Lines 28-29, BRIEF DESCRIPTION OF THE SEVERAL VIEWS OF THE DRAWING" kindly delete "DRAWING", and insert -- DRAWINGS --.

<u>Column 12,</u>
Line 12, kindly delete the period after "8", and insert -- ; and --.

<u>Column 15,</u>
Lines 18 and 21, after B-B, kindly delete "C", and insert -- ₵ --.

Lines 32 and 33, kindly delete "C", and insert -- ₵ --.

UNITED STATES PATENT AND TRADEMARK OFFICE
CERTIFICATE OF CORRECTION

PATENT NO. : 6,691,392 B2
DATED : February 17, 2004
INVENTOR(S) : Savoy et al.

It is certified that error appears in the above-identified patent and that said Letters Patent is hereby corrected as shown below:

Column 18,
Line 21, kindly delete "A" at the beginning of the line, and insert -- a --.
Line 59, kindly delete "the".

Column 19,
Line 16, kindly delete "product" and insert -- production --.

Column 20,
Line 13, kindly delete ",wherein" and insert -- , wherein --.
Line 18, after "said at", kindly insert -- least two --.
Line 28, after "level and", kindly insert -- crank --.
Line 38, kindly insert -- ; -- at the end of the line.

Signed and Sealed this

Thirty-first Day of August, 2004

JON W. DUDAS
*Director of the United States Patent and Trademark Office*